United States Patent
Fallahmohammadi et al.

(10) Patent No.: US 10,718,917 B2
(45) Date of Patent: Jul. 21, 2020

(54) FLEXIBLE OPTICAL FIBER RIBBONS AND METHODS OF FORMATION THEREOF

(71) Applicant: Prysmian S.p.A., Milan (IT)

(72) Inventors: Ehsan Fallahmohammadi, Lexington, SC (US); Clint Nicholaus Anderson, Lexington, SC (US); Brian G. Risch, Granite Falls, NC (US)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 16/111,707

(22) Filed: Aug. 24, 2018

(65) Prior Publication Data

US 2020/0064574 A1 Feb. 27, 2020

(51) Int. Cl.
*G02B 6/44* (2006.01)

(52) U.S. Cl.
CPC .......... *G02B 6/4404* (2013.01); *G02B 6/448* (2013.01)

(58) Field of Classification Search
CPC .... G02B 6/4403; G02B 6/443; G02B 6/4494; G02B 6/4495; G02B 6/3885; G02B 6/44
See application file for complete search history.

(56) References Cited

U.S. PATENT DOCUMENTS

| | | | |
|---|---|---|---|
| 7,187,830 B2 | 3/2007 | Blazer | |
| 7,206,481 B2 * | 4/2007 | Quinn | G02B 6/4486 112/113 |
| 8,548,294 B2 | 10/2013 | Toge et al. | |
| 8,787,718 B2 * | 7/2014 | Tanabe | G02B 6/4405 385/102 |
| 9,008,478 B2 * | 4/2015 | Matsuzawa | G02B 6/4482 385/115 |
| 9,086,555 B2 | 7/2015 | Namazue et al. | |
| 9,116,321 B2 | 8/2015 | Sato et al. | |
| 9,389,386 B2 | 7/2016 | Matsuzawa et al. | |
| 2017/0031121 A1 | 2/2017 | Blazer et al. | |

FOREIGN PATENT DOCUMENTS

| | | |
|---|---|---|
| EP | 1143280 A1 | 10/2001 |
| JP | 2010044336 A | 2/2010 |
| JP | 2011221198 A | 11/2011 |
| JP | 2011221199 A | 11/2011 |
| JP | 5291042 B2 | 9/2013 |
| JP | 2014016529 A | 1/2014 |
| JP | 2014016530 A | 1/2014 |
| JP | 2016075746 A | 5/2016 |

* cited by examiner

*Primary Examiner* — Jennifer Doan
(74) *Attorney, Agent, or Firm* — Slater Matsil, LLP

(57) ABSTRACT

An optical fiber cable includes a plurality of flexible ribbons, a plurality of first bonding regions and a second bonding region. Each of the plurality of flexible ribbons includes a plurality of optical fibers. Adjacent ones of the plurality of optical fibers are attached to each other by one of the plurality of first bonding regions. The second bonding region joins a first one of the plurality of flexible ribbons with a second one of the plurality of flexible ribbons.

26 Claims, 32 Drawing Sheets

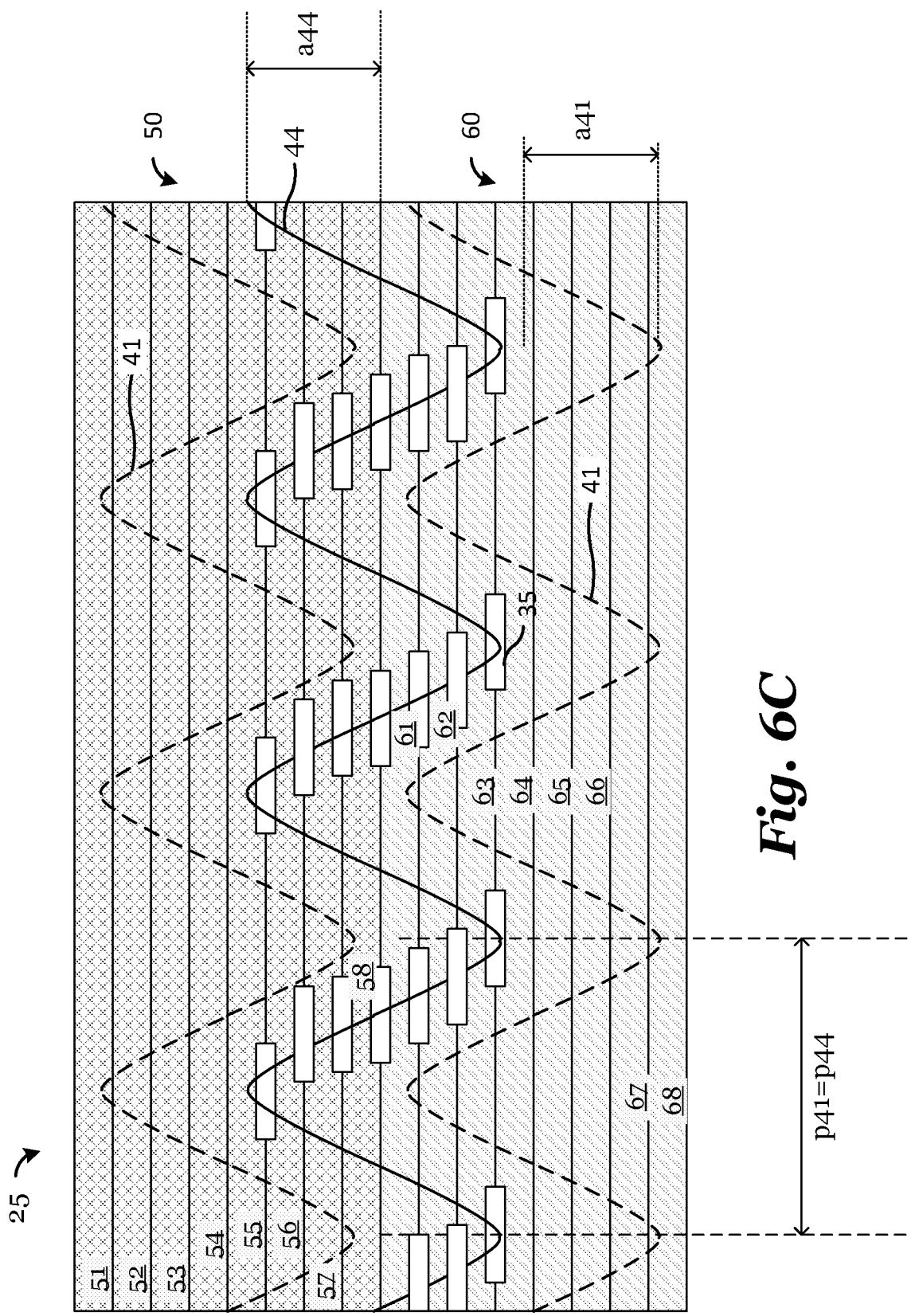

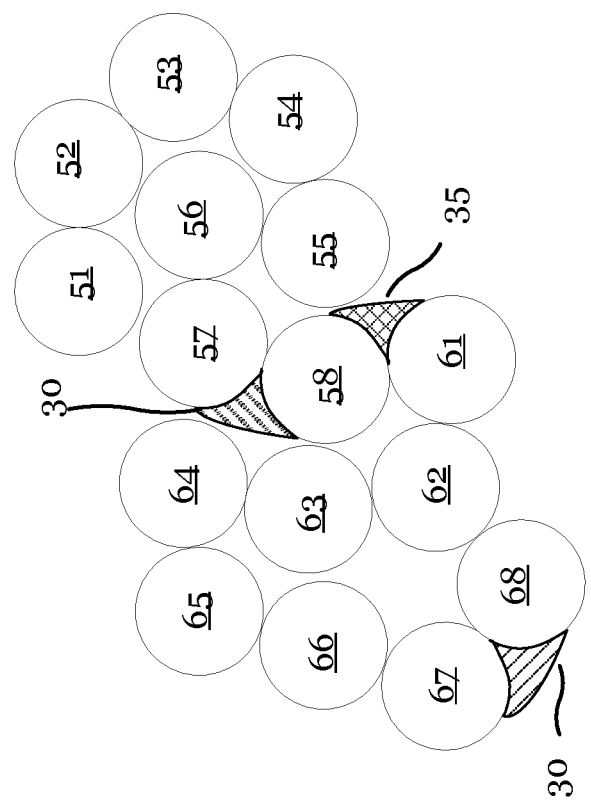

US 10,718,917 B2

FLEXIBLE OPTICAL FIBER RIBBONS AND METHODS OF FORMATION THEREOF

TECHNICAL FIELD

The present application relates generally to optical fiber cables, and, in particular embodiments, to flexible optical fiber ribbons and methods of formation thereof.

BACKGROUND

Optical fibers are very small diameter glass strands capable of transmitting an optical signal over great distances, at very high speeds, and with relatively low signal loss relative to standard copper wire networks. Optical cables are therefore widely used in long distance communication and have replaced other technologies such as satellite communication, standard wire communication etc. Besides long distance communication, optical fibers are also used in many applications such as medicine, aviation, computer data servers, etc.

There is a growing need in many applications for optical cables that are able to transfer high data rates while taking minimum space. Such need can arise, for example, in data servers where space for the optical fiber is a critical limiting factor. In particular, data servers are processing increasingly higher amounts of data that require increased connectivity to the data servers. With the dramatic increase of data capacity among data centers all over the world due to expanding of crowd computing, the demand for high-fiber-count and high density optical cable increases. However, the maximum size of the optical cable is limited by the size of the ducts through which the cables have to be passed through. Squeezing the conventional optical cables through the ducts is not a viable option. This is because while conventional optical fibers can transmit more data than copper wires, they are also more prone to damage during installation. The performance of optical fibers within the cables is very sensitive to bending, buckling, or compressive stresses. Excessive compressive stress during manufacture, cable installation, or service can adversely affect the mechanical and optical performance of conventional optical fibers. Therefore, there is a need to reduce the diameter and weight of the cable. Decreasing cable diameter and weight will make it possible to use existing facilities such as underground ducts or telephone pole, and will reduce cable cost and installation cost.

In addition, to shorten the operation time of mid-span access or cable connection, the cable structure having easy workability is required.

SUMMARY

In accordance with an embodiment of the present application, an optical fiber cable includes a plurality of flexible ribbons, a plurality of first bonding regions and a second bonding region. Each of the plurality of flexible ribbons includes a plurality of optical fibers. Adjacent ones of the plurality of optical fibers are attached to each other by one of the plurality of first bonding regions. The second bonding region joins a first one of the plurality of flexible ribbons with a second one of the plurality of flexible ribbons.

In accordance with another embodiment of the present application, an optical fiber cable includes a plurality of flexible ribbons including a first flexible ribbon and a second flexible ribbon, a plurality of first bonding regions, and a plurality of second bonding regions including a first discrete region and a second discrete region. Each of the plurality of flexible ribbons includes a plurality of optical fibers. Adjacent ones of the plurality of optical fibers are attached to each other by one of the plurality of first bonding regions. The first discrete region joins a last optical fiber of the first flexible ribbon of the plurality of flexible ribbons with a first optical fiber of the second flexible ribbon of the plurality of flexible ribbons and is disposed at a first intersecting region between the last optical fiber and the first optical fiber. The second discrete region is spaced at a first pitch from the first discrete region, the second discrete region joining the last optical fiber with the first optical fiber and is disposed at a second intersecting region between the last optical fiber and the first optical fiber.

In accordance with another embodiment of the present application, a method for forming an optical fiber cable includes forming a plurality of flexible ribbons by attaching a plurality of optical fibers using a plurality of first bonding regions, where adjacent ones of the plurality of optical fibers are attached to each other by one of the plurality of first bonding regions. The method may also include forming a flexible ribbon assembly by attaching the plurality of flexible ribbons using a plurality of second bonding regions, where adjacent ones of the plurality of flexible ribbons are attached to each other by one of the plurality of second bonding regions.

BRIEF DESCRIPTION OF THE DRAWINGS

For a more complete understanding of the present application, and the advantages thereof, reference is now made to the following descriptions taken in conjunction with the accompanying drawings, in which:

FIGS. 1A-1C illustrates a unitized flexible ribbon of an optical cable in accordance with an embodiment of the present application, wherein FIG. 1A illustrates a top view of a unitized flexible ribbon comprising a continuous bonding region between adjacent flexible ribbons, wherein FIG. 1B illustrates a bottom view of the unitized flexible ribbon illustrating the continuous bonding region, wherein FIG. 1C illustrates a corresponding cross-sectional area of the unitized flexible ribbon illustrated in FIGS. 1A-1B;

FIGS. 2A-2B illustrates a unitized flexible ribbon of an optical cable in accordance with an embodiment of the present application, wherein FIG. 2A illustrates a top view of a unitized flexible ribbon comprising a continuous bonding region having a wave pattern, and wherein FIG. 2B illustrates a bottom view of the unitized flexible ribbon illustrating the continuous bonding region;

FIG. 3A illustrates a top view of a unitized flexible ribbon of the optical cable. FIG. 3B illustrates a bottom view of the unitized flexible ribbon of the optical cable. FIG. 3C illustrates a corresponding cross-sectional area of the unitized flexible ribbon illustrated in FIGS. 3A-3B;

FIGS. 4A-4B illustrates a unitized flexible ribbon of an optical cable in accordance with an embodiment of the present application, wherein FIG. 4A illustrates a top view of a unitized flexible ribbon comprising intermittent bonding regions, and wherein FIG. 4B illustrates a bottom view of the unitized flexible ribbon illustrating the intermittent bonding regions;

FIGS. 5A-5B illustrates a unitized flexible ribbon of an optical cable in accordance with an alternative embodiment of the present application, wherein FIG. 5A illustrates a top view of a unitized flexible ribbon comprising intermittent bonding regions having an alternative pattern, and wherein FIG. 5B illustrates a bottom view of the unitized flexible ribbon illustrating the intermittent bonding regions;

FIGS. 6A-6C illustrates a unitized flexible ribbon of an optical cable in accordance with an alternative embodiment of the present application, wherein FIG. 6A illustrates a top view of a unitized flexible ribbon comprising intermittent bonding regions having yet another alternative pattern, wherein FIG. 6B illustrates a bottom view of the unitized flexible ribbon illustrating the intermittent bonding regions, and wherein FIG. 6C illustrates a bottom view of the unitized flexible ribbon illustrating the intermittent bonding regions in an alternative embodiment;

FIGS. 7A-7B illustrates a unitized flexible ribbon of an optical cable in accordance with an alternative embodiment of the present application, wherein FIG. 7A illustrates a top view of a unitized flexible ribbon comprising intermittent bonding regions having yet another alternative pattern, and wherein FIG. 7B illustrates a bottom view of the unitized flexible ribbon illustrating the intermittent bonding regions;

FIGS. 8A-8E illustrates a unitized flexible ribbon of an optical cable in accordance with an alternative embodiment of the present application, wherein FIG. 8A illustrates a top view of a unitized flexible ribbon comprising intermittent bonding regions having a first pattern, wherein FIG. 8B illustrates a top view of a unitized flexible ribbon comprising intermittent bonding regions having a different second pattern, wherein FIG. 8C illustrates a top view of a unitized flexible ribbon comprising intermittent bonding regions having a different third pattern, wherein FIG. 8D illustrates a top view of a unitized flexible ribbon comprising intermittent bonding regions having a different fourth pattern, and wherein FIG. 8E illustrates a top view of a unitized flexible ribbon comprising intermittent bonding regions having a different square wave pattern;

FIGS. 9A-9C illustrate cross-sectional view of the unitized flexible ribbon, a buffer tube, and an optical cable in accordance with embodiments of the present application, wherein FIG. 9A illustrates a unitized flexible ribbon folded together in accordance with an embodiment of the present application, FIG. 9B illustrates a cross-sectional view of a buffer tube formed using a plurality of flexible ribbon assemblies, and FIG. 9C illustrates a cross-sectional view of the optical cable comprising a plurality of buffer tubes of FIG. 9B; and FIGS. 10A-10E illustrates an unitized flexible ribbon during various stages of fabrication in accordance with embodiments of the present application, wherein FIG. 10A illustrates the assembly process for a flexible ribbon from a plurality of optical fibers, wherein FIG. 10B illustrates a plurality of flexible ribbons during formation of first bonding regions at a top side, wherein FIG. 10C (similar to FIG. 10A) illustrates the formation of a flexible ribbon assembly from a plurality of flexible ribbons in accordance with embodiments of the present invention, wherein FIG. 10D illustrates a cross-sectional view of the plurality of flexible ribbons during formation of second bonding regions at an opposite bottom side, and wherein FIG. 10E illustrates a top view of the plurality of flexible ribbons during formation of second bonding regions at the bottom side along a predetermined pattern.

FIGS. 11A-11B illustrates alternative embodiments of an unitized flexible ribbon during various stages of fabrication in which the optical ribbon is stationary during the bonding process, wherein FIG. 11A illustrates a plurality of flexible ribbons during formation of first bonding regions at a top side, and wherein FIG. 11B illustrates a cross-sectional view of the plurality of flexible ribbons during formation of second bonding regions at an opposite bottom side.

DETAILED DESCRIPTION OF ILLUSTRATIVE EMBODIMENTS

The presently preferred embodiments, including their making and use, are discussed below in detail. However, it should be appreciated that the present application supplies many applicable inventive concepts which can be embodied in a wide variety of specific contexts. The specific embodiments discussed here are merely descriptive of specific ways to make and use the invention. These specific embodiments do not limit the scope of the invention.

The present application will be described by referring to exemplary embodiments in a specific context, namely the structure and making of unitized flexible ribbons comprising a plurality of optical fibers.

In various embodiments, unitized structures of flexible ribbons used in optical cables are disclosed. An optical cable includes many such ribbons, where each ribbon may be made of a number of optical fibers, for example, twelve to sixteen optical fibers. Embodiments of the present application describe joining flexible ribbons using a pattern of matrix materials so as to unitize the ribbons thereby forming an assembly of flexible ribbons. For example, two flexible ribbons of twelve optical fibers become a single unitized ribbon of twenty four optical fibers.

Embodiments of the present application provide an advantage in manufacturing cables of flexible ribbons as fewer independent components have to be stranded and injected into the cable during the ribbon buffering process. For example, embodiments of the present application can reduce the number of pay-off during ribbon buffering where a high number of ribbon bobbins are used for high fiber count cable. Due to the enhanced flexibility provided by the flexible ribbon assembly, more number of optical fibers can be packed within each buffer tube enabling higher fiber density. In addition, the user/installer of these cables will benefit due to a reduction in complexity. For example, when the user/installer removes the unitized ribbons or flexible ribbon assemblies from the buffer tube, fewer ribbons have to be handled and easier steps need to be taken for mass splicing of the optical fibers. As illustration, instead of exposing 144 flexible ribbons (each with twelve optical fibers) from a buffer tube, the user/installer will have to deal only with 72 unitized flexible ribbons with 2×12 optical fibers in each. This will be easier to get into the enclosure prior to splitting the ribbons and splicing the optical fibers.

Figure 1A:
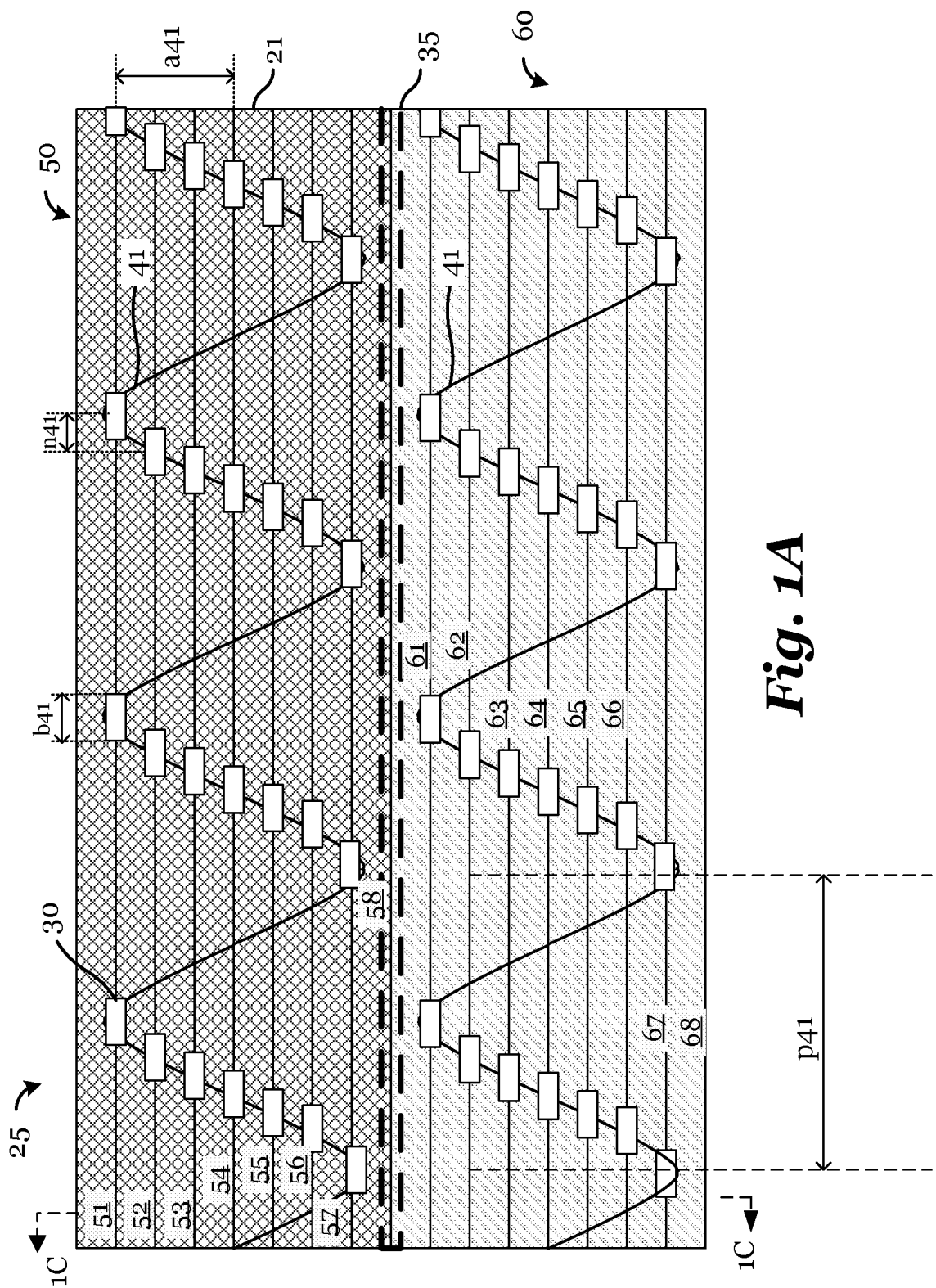
Figure 1B:
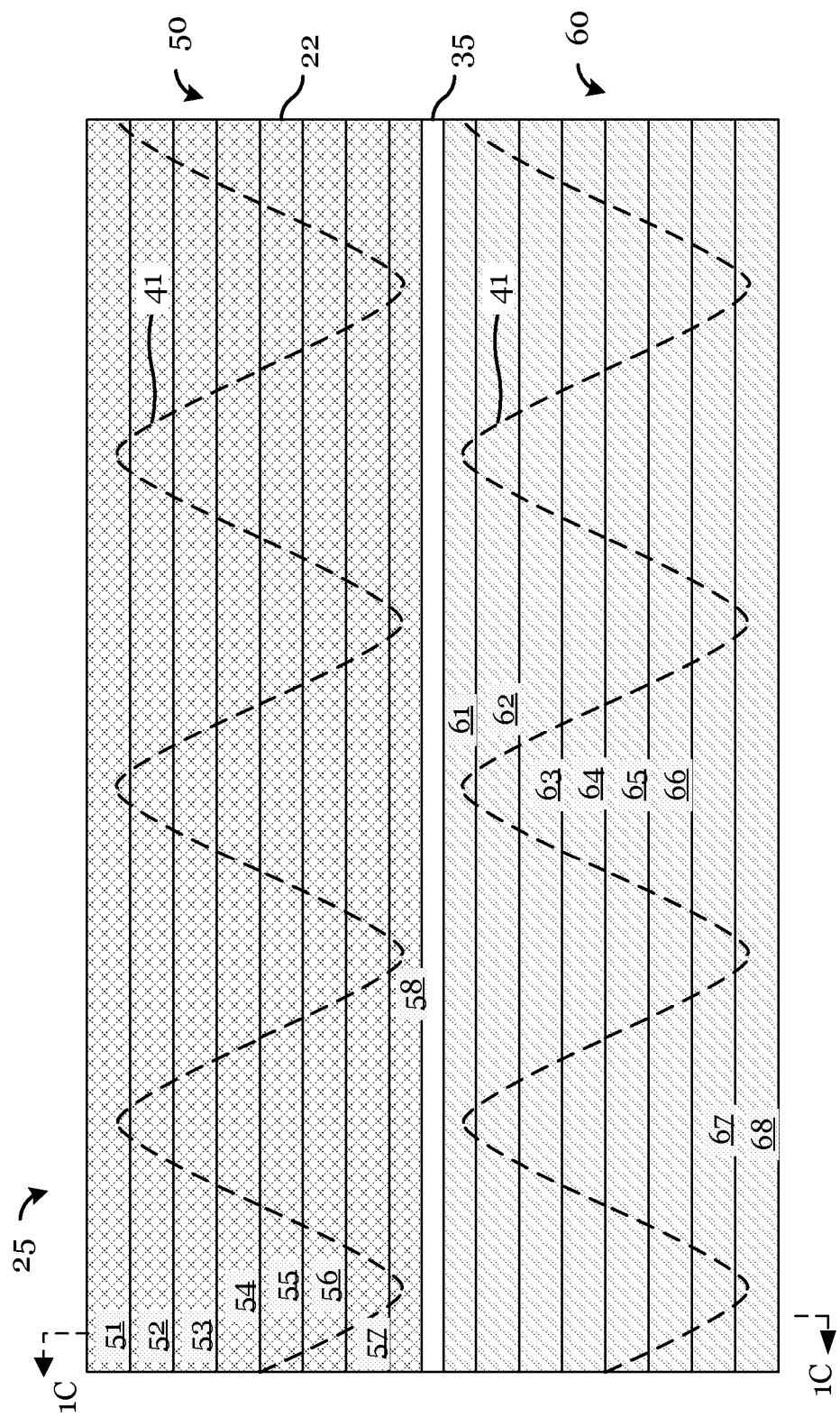
Figure 1C:
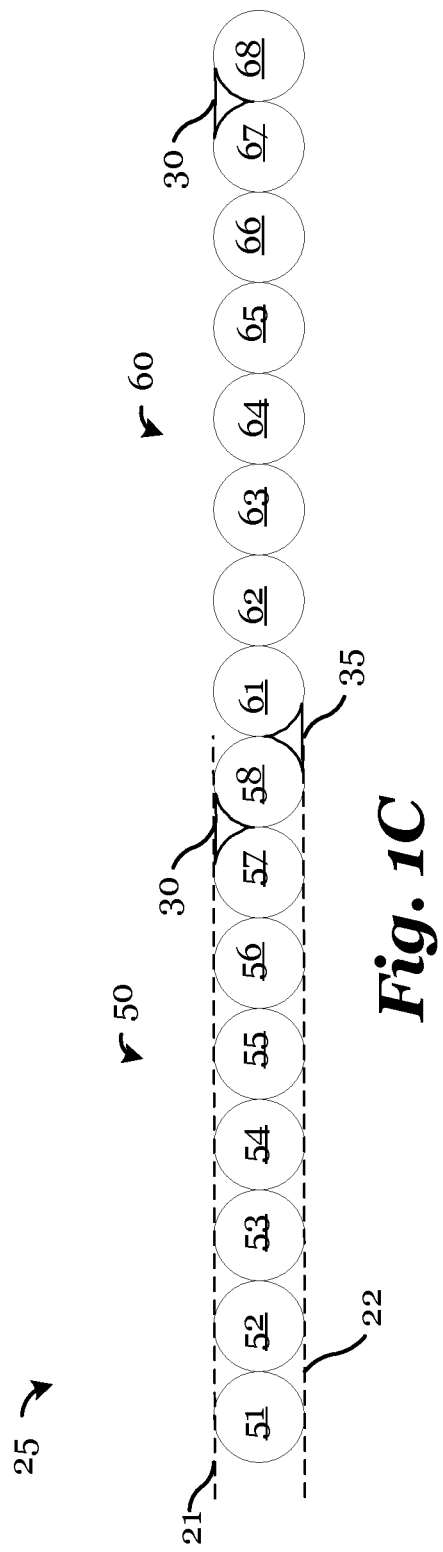

A flexible optical ribbon assembly with a continuous bonding region between its component flexible optical ribbons will initially be described in top, bottom, and cross-sectional views in FIGS. 1A-C. This is followed by descriptions of several additional structural embodiments of the flexible ribbon assembly, varying in the shapes and positions of the applied bonding regions between the component optical fibers, in FIGS. 2A-2B, 3A-3C, 4A-4B, 5A-5B, 6A-6C, 7A-7B, and 8A-8E. An optical cable design implementing embodiments of the present application will be described using FIGS. 9A-9C. A method for making the unitized flexible optical ribbon will be described using FIGS. 10A-10E and 11A-11B. All figures, except FIG. 9A-9C, illustrate the flexible ribbons in rolled-out or planar configuration. In a cable, the flexible ribbons are rolled-up or wrapped together in buffer tubes as illustrated, for example, in FIGS. 9A-9C.

FIGS. 1A-1C illustrates an optical cable in accordance with an embodiment of the present application. FIG. 1A illustrates a top view of a unitized flexible ribbon of the optical cable. FIG. 1B illustrates a bottom view of the unitized flexible ribbon of the optical cable. FIG. 1C illustrates a corresponding cross-sectional area of the unitized flexible ribbon illustrated in FIGS. 1A-1B.

Referring to FIG. 1A, the optical cable includes a flexible ribbon assembly 25 comprising a plurality of flexible ribbons such as a first flexible ribbon 50 and a second flexible ribbon 60. In various embodiments, a plurality of optical fibers is stacked or bunched together to form a single flexible ribbon. However, unlike conventional ribbons that are stacked and encapsulated together, in various embodiments, each of the optical fiber is attached loosely (in a non-rigid manner, without encapsulation) so that the ribbon maintains flexibility to be arranged in different shapes. For example, as illustrated in the cross-sectional view of FIG. 1C, the first flexible ribbon 50 includes a first set of optical fibers 51-58 while the second flexible ribbon 60 includes a second set of optical fibers 61-68. Although only eight optical fibers are illustrated, in various embodiments, an individual flexible ribbon may include a greater or smaller number of optical fibers. For example, in one embodiment, the first and the second flexible ribbons 50 and 60 include six optical fibers. Yet, in another embodiment, the first and the second flexible ribbons 50 and 60 may include twelve or sixteen optical fibers. In other words, the number of optical fibers may vary depending on the application.

Referring to FIGS. 1A and 1C, adjacent optical fibers are attached together at first bonding regions 30. As best illustrated in FIG. 1C, the first bonding regions 30 fill the gaps between adjacent optical fibers such as the seventh optical fiber 57 and the eighth optical fiber 58. In addition, the first bonding regions 30 are formed on the first side 21 of the first flexible ribbon 50 as opposed to the second side 22.

Referring to FIG. 1A, adjacent first bonding regions 30 joining optical fibers are separated from each other by a first pitch p41. Although, the first pitch p41 does not vary within the cable as illustrated in FIG. 1A, in some embodiments, the first pitch p41 may not be constant within the cable. To maintain a constant pitch, the first bonding regions 30 has a duty cycle of 50%, in other words, formed only during half the wave cycle. In other words, at a 50% duty junction, only alternate intersections between adjacent optical fibers along the first pattern 41 have a bonding region. In case of a 100% duty cycle, all intersections between adjacent optical fibers along the first pattern 41 have a bonding region.

The first pitch p41 may vary, for example, from about 10 mm to about 500 mm depending on the application. In one or more embodiments, the first pitch p41 may vary from about 30 mm to about 100 mm.

The first bonding regions 30 extend into the page of FIG. 1C and as illustrated in FIG. 1A may have a first bond length b41. The first bond length b41 may vary, for example, from about 1 mm to about 50 mm depending on the application. In one or more embodiments, the first bond length b41 may vary from about 5 mm to about 20 mm.

Each first bonding region 30 is separated from the nearest first bonding region joining different optical cables by a first neighbor distance n41.

In various embodiments, these distances (first pitch p41, first bonding length b41, and the first neighbor distance n41) will be varied to achieve a pre-determined set of mechanical properties of the ribbons such as strength, flexibility or rigidity and to achieve a target production cost and capability.

In addition, drawing a curve passing through the nearest neighboring regions of the first bonding regions 30 results in a first pattern 41. In the illustration, the first pattern 41 comprises a wave pattern. The wave pattern may be described using the first pitch p41, first bonding length b41, and the first neighbor distance n41. Alternately, the wave pattern may be described using the wavelength (first pitch p41) and a first amplitude a41 along with the first bonding length b41. In various embodiments, the wave pattern formed by the first bonding regions 30 may comprise any type of waves such as square waves, sine waves, cosine waves, triangular waves, and others.

However, in various embodiments, the first bonding regions 30 may be arranged in other patterns. Some of these alternate patterns will be described further in subsequent embodiments.

In various embodiments, the first bonding regions 30 may comprise a matrix material acting as the bonding agent between the adjacent optical fibers. In one embodiment, the matrix material of the first bonding regions 30 may comprise an acrylic-based, light-cured instant adhesive, such as a UV cured acrylate material. In another embodiment, the matrix material of the first bonding regions 30 may comprise a cured resin. In alternative embodiments, the first bonding regions 30 may comprise other bonding materials such as a thermoplastic material.

Referring to FIGS. 1A-B, the first flexible ribbon 50 is attached to the second flexible ribbon 60 at a second bonding region 35. In various embodiments, the second bonding region 35 is formed on the second side 22, opposite the first side 21 on which the first bonding regions 30 are formed. This is illustrated in FIG. 1A, where solid lines and white regions illustrate the first bonding regions 30 on the first side 21. In contrast, dashed lines illustrate the second bonding region 35 on the second side 22. In FIG. 1B, which gives a bottom view, the first pattern 41 of the first bonding regions 30 on the first side 21 is illustrated with dashed lines and the second bonding region 35 on the second side 22 is depicted with solid lines and white regions. This convention is maintained throughout the remaining figures. However, as will be clear from later description, the first side 21 and the second side 22 are not planes in an optical cable since the flexible ribbons are folded. In other words, the first side 21 and the second side 22 are in the same plane before being folded and incorporated into the cable. But once within the cable, the ribbon is folded and therefore the first side 21 and the second side 22 may not share a common plane.

FIGS. 1A-C illustrate an embodiment in which the second bonding region 35 extends linearly and continuously between adjacent flexible ribbons such as the first flexible ribbon 50 and the second flexible ribbon 60. As illustrated in FIG. 1B, the second bonding region 35 joins adjacent optical fibers of the first and the second flexible ribbons 50 and 60. This is also illustrated in FIG. 1C, where the second bonding region 35 fills the gap between the eighth optical fiber 58 from the first set of optical fibers 51-58 of the first flexible ribbon 50 with the first optical fiber 61 from the second set of optical fibers 61-68 of the second flexible ribbon 60.

In addition, the second bonding region 35 is formed on the second side 22 of the flexible ribbon assembly 25, which is on the opposite side of the first bonding regions 30. Accordingly, in this embodiment, the flexible ribbon assembly 25 comprises the first flexible ribbon 50 and the second flexible ribbon 60, unitized by the linear, continuous second bonding region 35.

However, in various embodiments, a plurality of second bonding regions 35 may be used instead of a single second bonding region, and the plurality of second bonding regions 35 may be arranged in other patterns. Some of these alternate patterns will be described further in subsequent embodiments.

Advantageously, as the bonding area of the plurality of second bonding regions 35 is much smaller than a conventional encapsulation that covers all the optical fibers, the flexible ribbon assembly 25 maintains a higher degree of flexibility. In addition, the smaller bonding area results in a smaller bond strength resulting in easier separability of the flexible ribbons in to smaller groups of two or three for mass fusion splicing. Preferably the bonding strength of the second bonding regions 35 is less than the bonding strength of the first bonding regions 30. This creates a preferential separating between the flexible ribbons when the flexible ribbon assembly 25 is split in groups of two or three flexible ribbons for mass fusion splicing and prevents one or more fibers of one flexible ribbon to remain attached to the adjacent flexible ribbon. The bond strength of the second bonding regions 35 (as well as the first bonding regions 30) may be adjusted by the length of the bonding regions, the degree of curing of the flexible ribbon surface, or the composition of the bonding material such as the presence or quantity of adhesion promotors.

In various embodiments, when measured using a technique such as a T-peel test, the bond strength of the first bonding regions 30 would be in the range of 0.1N to 1.5N, preferably between 0.1N and 0.3N, whereas the bond strength of the second bonding regions 35 (while being less than the bond strength of the first bonding regions) would be in the range of 0.01N to 0.3N, preferably between 0.01N and 0.1N.

In a T-peel test a single fiber, or a group of fibers from an end of the ribbon is clamped in a grip of the tensile tester (e.g. Instron 5567), while the remaining fibers from the same end of the ribbon are clamped in the opposite grip of the tensile tester and the force to separate both is measured. In such a T-peel test the force to break a single bond is measured.

Figure 2A:
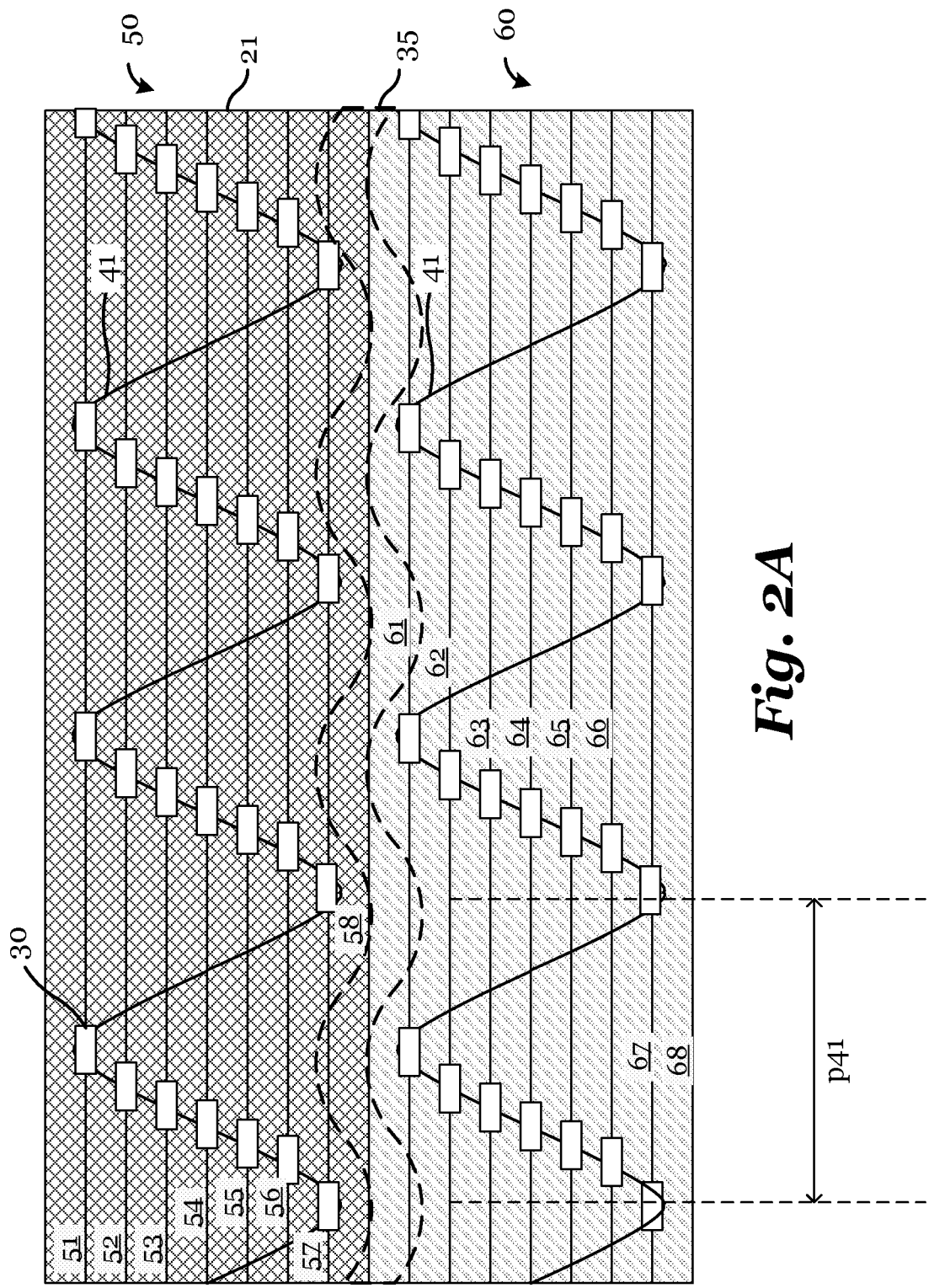
Figure 2B:
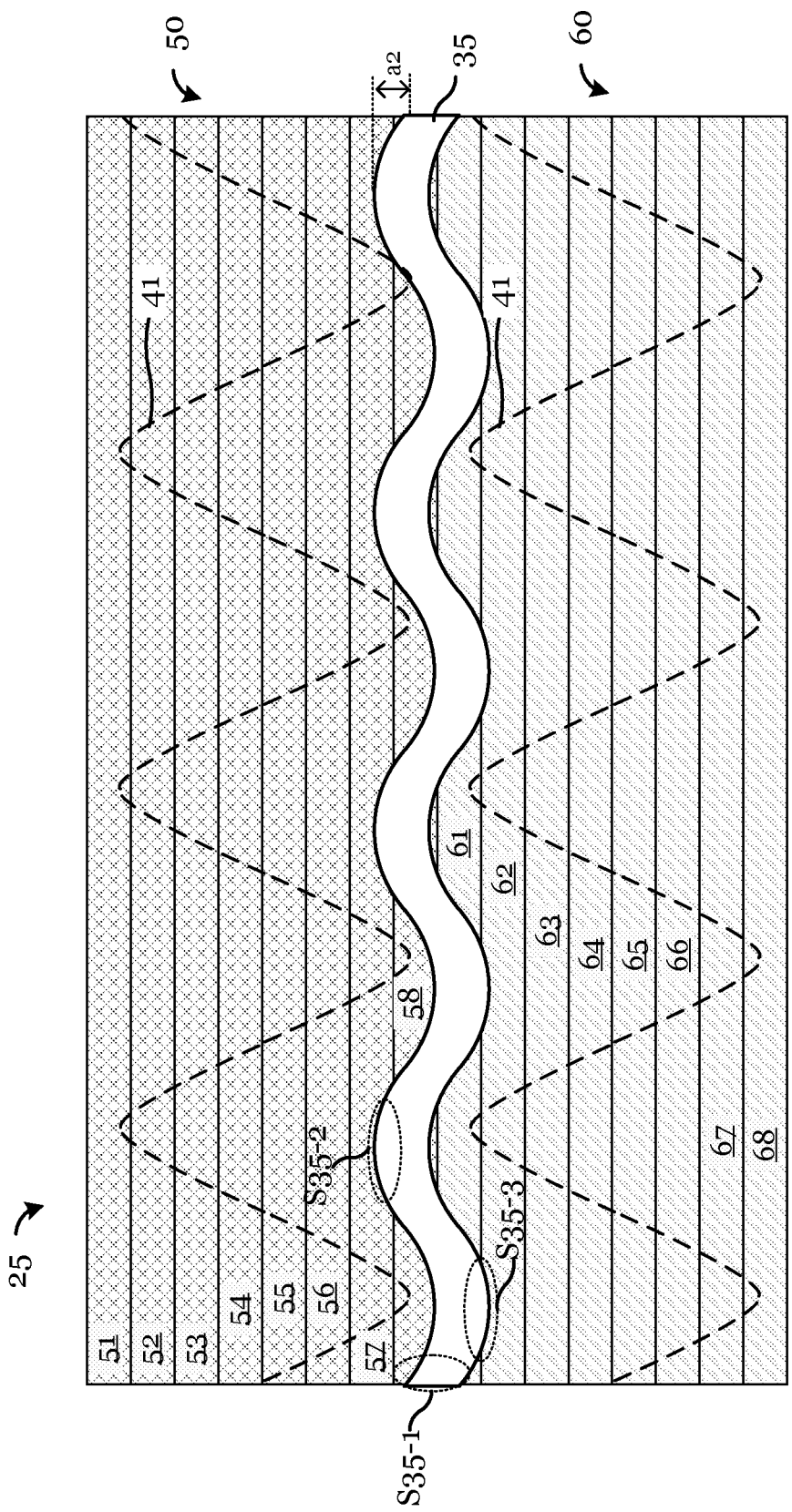

FIGS. 2A-2B illustrate another embodiment of the present application in which the second bonding region 35 has a continuous wave pattern. FIG. 2A illustrates the first side 21 of the flexible ribbon assembly 25 with first bonding regions 30 applied in the first pattern 41 having a first pitch p41 as described using FIG. 1A. FIG. 2B illustrates the bottom surface of the flexible ribbon assembly 25 with the second bonding region 35 is formed continuously along a wavelike pattern.

In the embodiment illustrated by FIGS. 2A-B, the second bonding region 35, similar to the prior embodiment, comprises a first section S35-1 that joins the eighth optical fiber 58 from the first set of optical fibers 51-58 of the first flexible ribbon 50 with the first optical fiber 61 from the second set of optical fibers 61-68 of the second flexible ribbon 60. However, unlike the prior embodiment, the second bonding region 35 further comprises a second section S35-2 and a third section S35-3 that join adjacent optical fibers within the same flexible ribbon. For example, in the illustration, the second section S35-2 joins the seventh optical fiber 57 from the first set of optical fibers 51-58 of the first flexible ribbon 50 with the eighth optical fiber 58 from the first set of optical fibers 51-58 of the first flexible ribbon 50. Similarly, the third section S35-3 joins the first optical fiber 61 from the second set of optical fibers 61-68 of the second flexible ribbon 60 with the second optical fiber 62 from the second set of optical fibers 61-68 of the second flexible ribbon 60.

As illustrated in FIG. 2B, the second bonding region 35 has a shape of wave having a second amplitude a2. In other embodiments, second bonding region 35 may have a larger amplitude (than illustrated in FIG. 2B) so that more optical fibers are joined by the second bonding region 35. In other words, as the second amplitude a2 of the continuous wave pattern increases, the second bonding region 35 will join together an increasing number of optical fibers in the first flexible ribbon 50 and the second flexible ribbon 60.

In various embodiments, the shape formed by the second bonding regions 35 may comprise any type of waves such as square waves, sine waves, cosine waves, triangular waves, and others. In further embodiments, the shape formed by the second bonding regions 35 may be an arbitrary shape such as a "zigzag" shape.

Figure 3A:
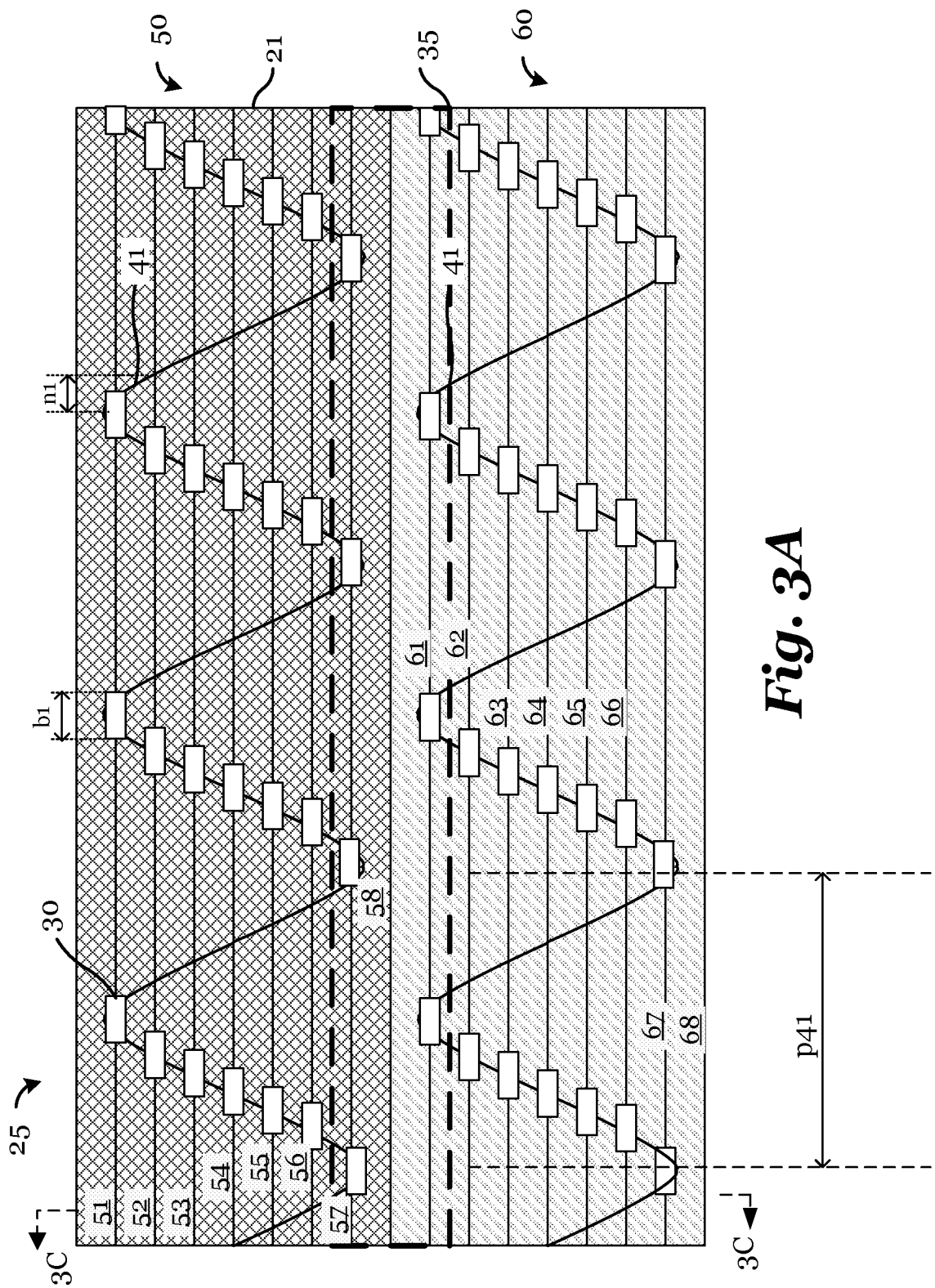
FIGS. 3A-3C illustrates a unitized flexible ribbon of an optical cable in accordance with an embodiment of the present application.
Figure 3B:
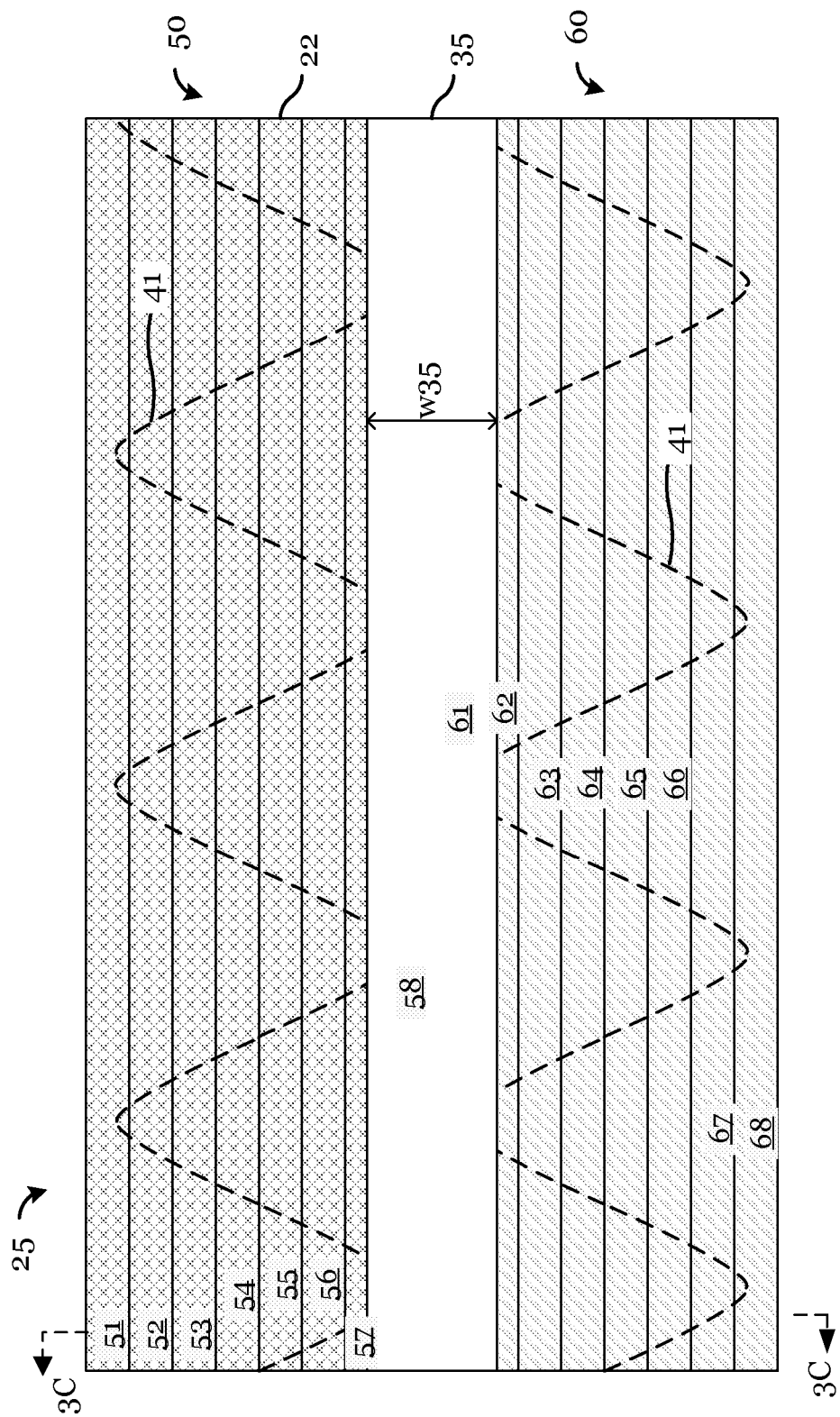
Figure 3C:
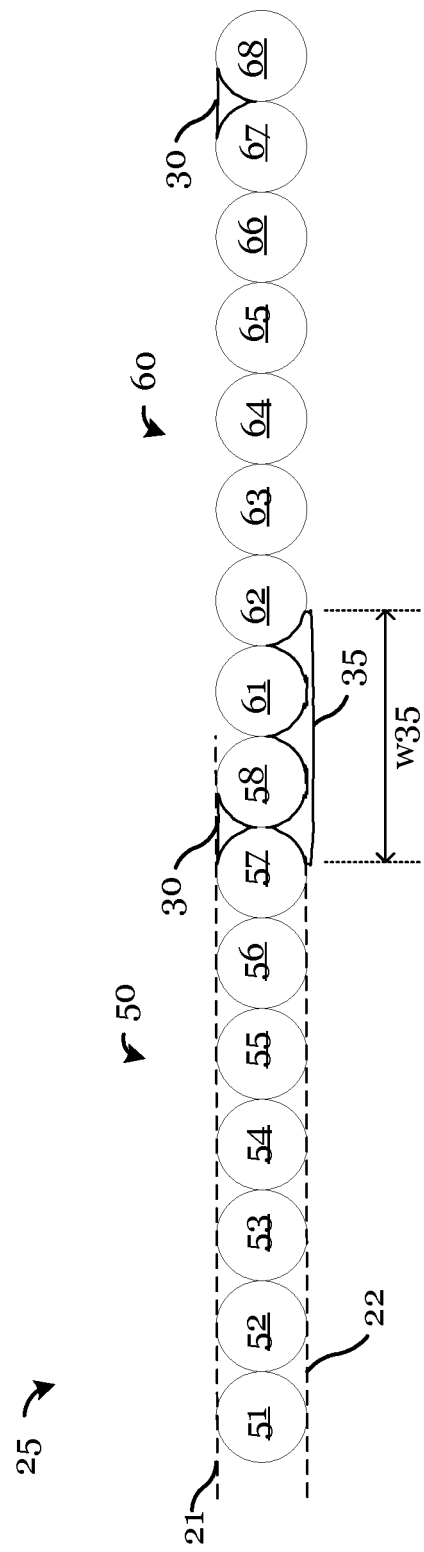

FIGS. 3A-3C illustrates an optical cable in accordance with an embodiment of the present application in which the second bonding region has a larger width to join together multiple optical fibers. FIG. 3A illustrates a top view of a unitized flexible ribbon of the optical cable. FIG. 3B illustrates a bottom view of the unitized flexible ribbon of the optical cable. FIG. 3C illustrates a corresponding cross-sectional area of the unitized flexible ribbon illustrated in FIGS. 3A-3B.

In contrast to the embodiment of FIGS. 2A-2B, the second bonding region 35 is linear and continuous similar to the embodiment of FIGS. 1A-1C. However, unlike the embodiment described using FIGS. 1A-1C, in this embodiment, the second bonding region 35 is wider so as to join more optical fibers together.

Therefore, this embodiment may be similar to FIGS. 1A-1C in that a linear continuous second bonding region 35 is disposed on the second side 22 so as to join the first flexible ribbon 50 with the second flexible ribbon 60. However, unlike the embodiment of FIGS. 1A-1C, in this embodiment, the second bonding region 35 may be wider having a width w35 that overlaps more than just two optical fibers. In the illustration, the second bonding region 35 has a width w35 that overlaps with the seventh optical fiber 57 from the first set of optical fibers 51-58 of the first flexible ribbon 50, the eighth optical fiber 58 from the first set of optical fibers 51-58 of the first flexible ribbon 50, the first optical fiber 61 from the second set of optical fibers 61-68 of the second flexible ribbon 60, and the second optical fiber 62 from the second set of optical fibers 61-68 of the second flexible ribbon 60.

The second bonding region 35 may also be thicker so that a partial encapsulation of a plurality of optical fibers is achieved. While this embodiment may not be as flexible as the embodiment of FIGS. 1A-1C, the partial encapsulation provided by the second bonding region 35 may have an improved mechanical strength favored in some applications.

Figure 4A:
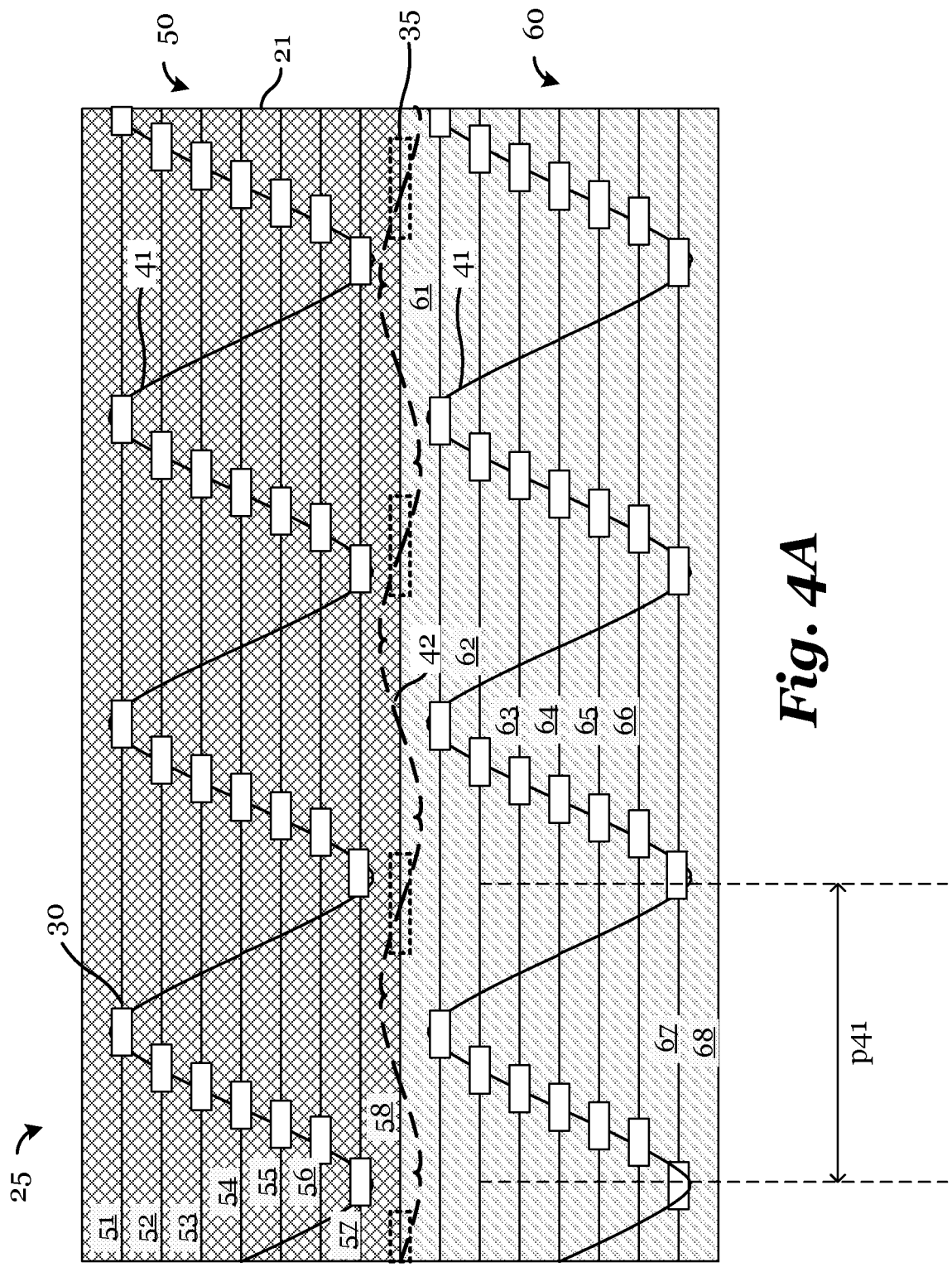
Figure 4B:
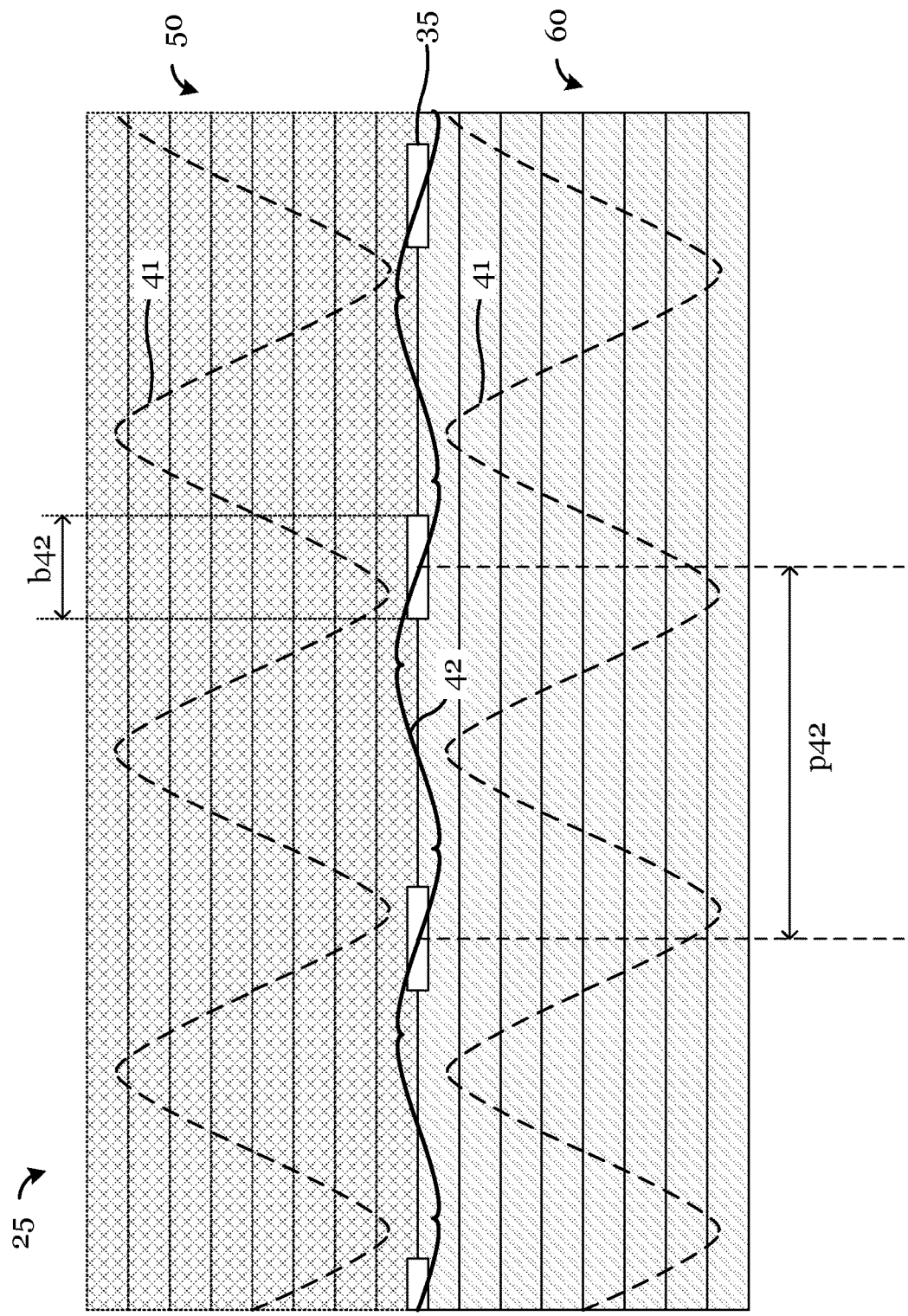

FIGS. 4A-4B illustrates a unitized flexible ribbon of an optical cable in accordance with an embodiment of the present application. FIG. 4A illustrates a top view of a unitized flexible ribbon comprising intermittent bonding regions, and FIG. 4B illustrates a bottom view of the unitized flexible ribbon illustrating the intermittent bonding regions.

In further embodiments, the second bonding region 35 may be applied in a manner similar to the first bonding regions 30 described in the prior embodiments. In other words, instead of a continuous second bonding region 35 (as described in FIGS. 1A-3C above), a plurality of second bonding regions 35 may be used to form an flexible ribbon assembly 25. Each bonding region of the plurality of second bonding regions 35 is shorter than the length of individual optical fibers.

Referring to FIGS. 4A-4B, in one embodiment, the first flexible ribbon 50 and the second flexible ribbon 60 are joined together on the second side 22. FIG. 4B illustrates that the plurality of second bonding regions 35 is applied between the adjacent optical fibers of the first flexible ribbon 50 and the second flexible ribbon 60.

The plurality of second bonding regions 35 may have a second bond length b42 as illustrated in FIG. 4B. The second bond length b42 may vary, for example, from about 1 mm to about 50 mm depending on the application. In one or more embodiments, the second bond length b42 may vary from about 5 mm to about 20 mm.

In the embodiment illustrated by FIG. 4B, adjacent bonding regions of the plurality of second bonding regions 35 are separated by a second pitch p42. The second pitch p42 may vary, for example, from about 10 mm to about 250 mm depending on the application. In one or more embodiments, the second pitch p41 may vary from about 30 mm to about 80 mm. In one embodiment, the second pitch p41 varies from 40 mm to 50 mm.

In addition, drawing a curve passing through the nearest neighboring regions of the second bonding regions 35 results in a second pattern 42. As illustrated in FIG. 4B, the second pattern 42 comprises a wave pattern. Similar to the first pattern 41, the second pattern 42 may also alternatively be described using the second pitch p42, and the second bond length b42.

In various embodiments, these distances (second pitch p42 and second bonding length b42) will be varied to achieve a pre-determined set of mechanical properties of the flexible ribbon assembly 25 such as strength, flexibility or rigidity and to achieve a target production cost and capability.

Figure 5A:
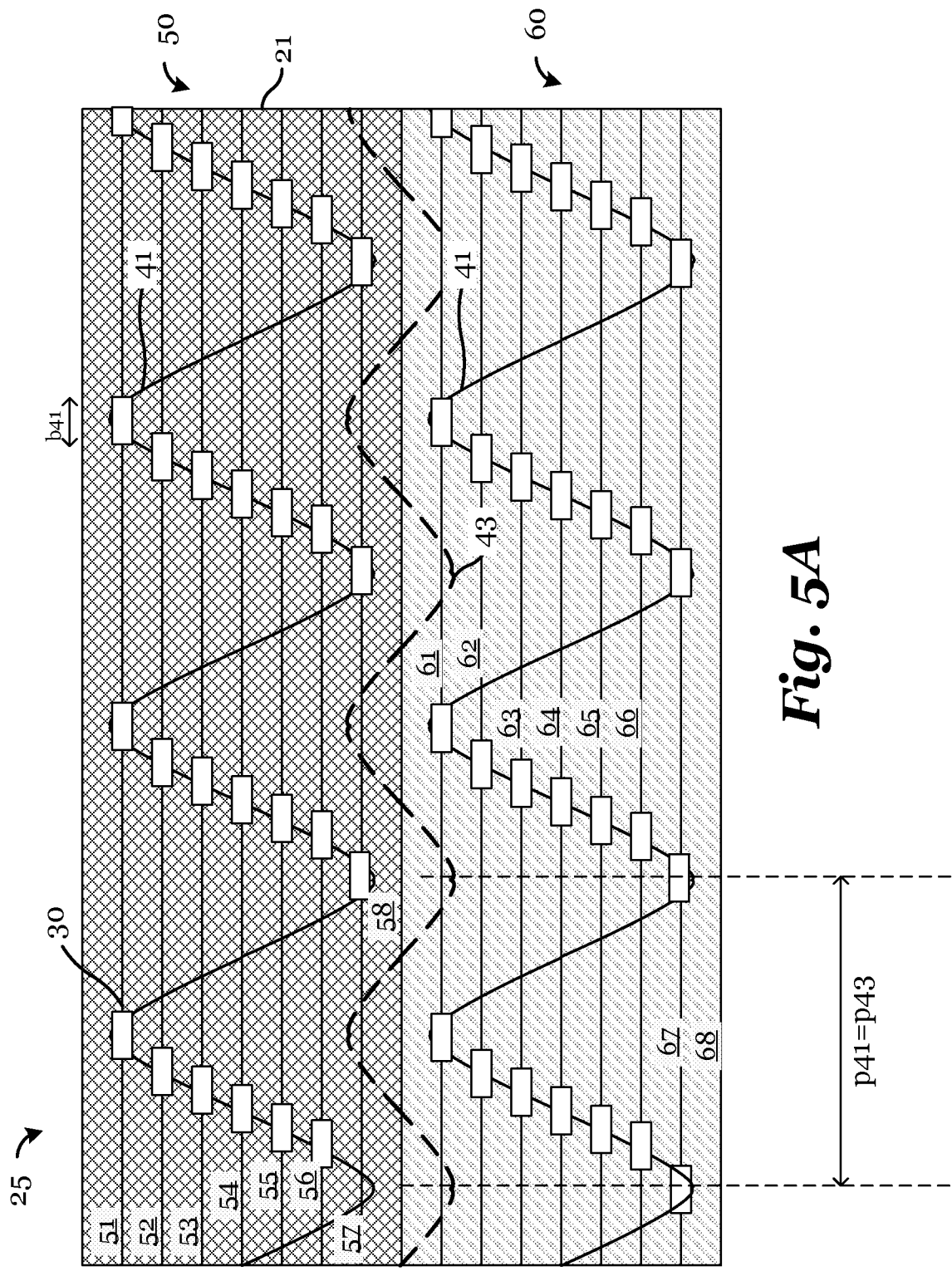
Figure 5B:
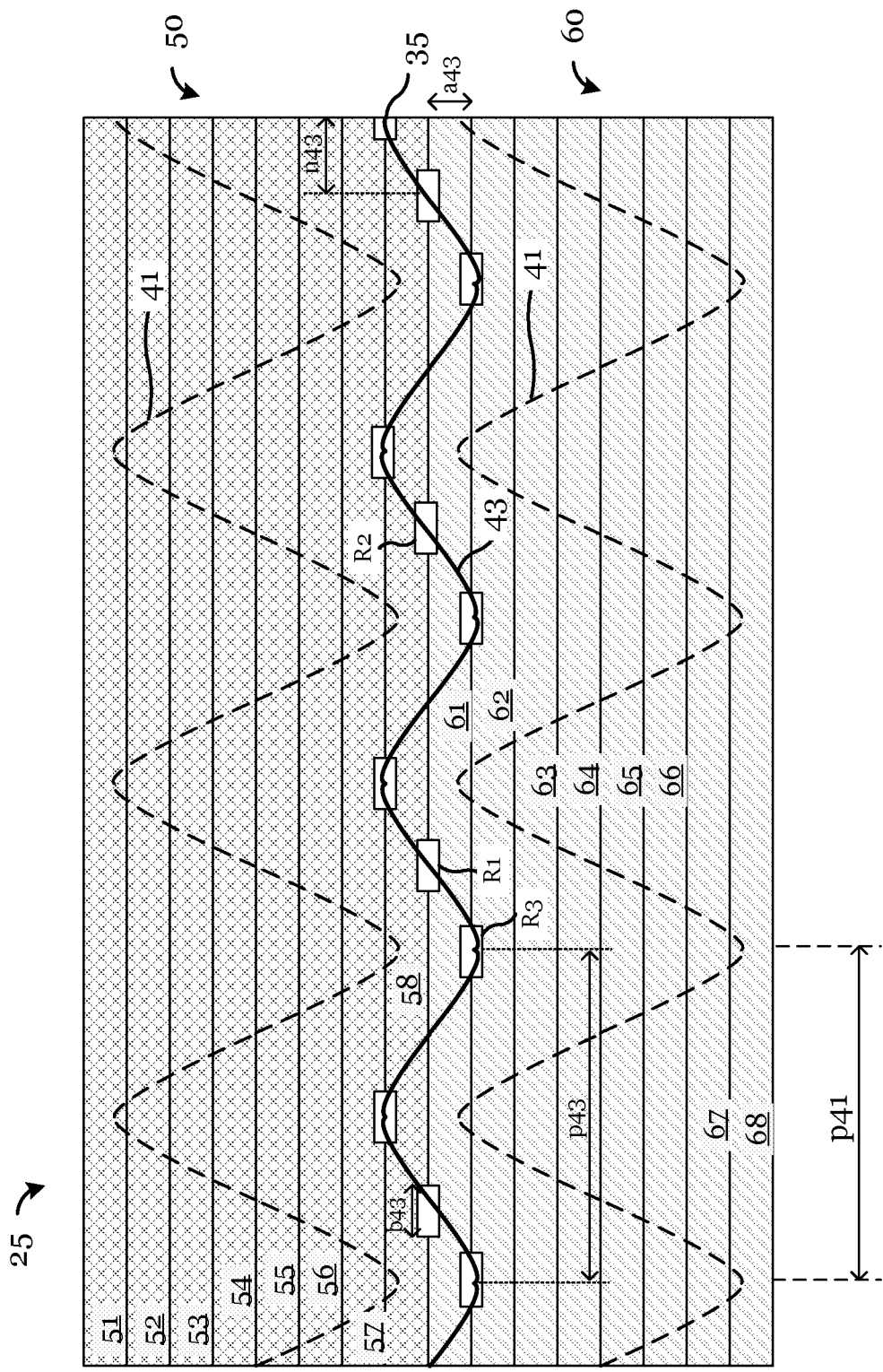

FIGS. 5A-5B illustrates a unitized flexible ribbon of an optical cable in accordance with an alternative embodiment of the present application, wherein FIG. 5A illustrates a top view of a unitized flexible ribbon comprising intermittent bonding regions having an alternative pattern than FIGS. 4A-4B, and wherein FIG. 5B illustrates a bottom view of the unitized flexible ribbon illustrating the intermittent bonding regions;

Unlike the prior embodiment of FIGS. 4A-4B, in this embodiment, the plurality of second bonding regions 35 is arranged as a wave so as to join together more than two optical fibers. Referring to FIGS. 5A-5B, in one embodiment, the plurality of second bonding regions 35 follows a third pattern 43.

Referring to FIG. 5B, adjacent plurality of second bonding regions 35 joining the same optical fibers are separated from each other by a third pitch p43. To maintain a constant pitch, the plurality of second bonding regions 35 has a duty cycle of 50%, in other words, formed only during half the wave cycle. The third pitch p43 may vary, for example, from about 10 mm to about 250 mm depending on the application. In one or more embodiments, the third pitch p43 may vary from about 30 mm to about 100 mm. In one embodiment, the third pitch p43 varies from 40 mm to 50 mm.

The plurality of second bonding regions 35 includes a first discrete region R1, a second discrete region R2. The first discrete region R1 and the second discrete region R2 join a last optical fiber (eighth optical fiber 58) of the first flexible ribbon 50 with a first optical fiber 61 of the second flexible ribbon 60. The first discrete region R1 and the second discrete region R2 are disposed at a first intersecting region and a second intersecting region between the last optical fiber and the first optical fiber 61. The second discrete region R2 is spaced from the first discrete region R1 by the third pitch p43.

Unlike the prior embodiment, in this embodiment, the plurality of second bonding regions 35 includes a third discrete region R3 connecting other optical fibers. The third discrete region R3 joins the first optical fiber 61 of the second flexible ribbon 60 with the second optical fiber 62 of the second flexible ribbon 60 and is disposed at a third intersecting region between the first optical fiber 61 and the second optical fiber 62.

Each of the plurality of second bonding regions 35 may have a third bond length b43. The third bond length b43 may vary, for example, from about 1 mm to about 50 mm depending on the application. In one or more embodiments, the third bond length b43 may vary from about 5 mm to about 20 mm. In the illustrated embodiment of FIGS. 5A and 5B, the first bond length b41 is substantially the same as the third bonding length b43.

Each of the plurality of second bonding regions 35 is separated from the nearest second bonding region joining different optical cables by a third neighbor distance n43. In various embodiments, these distances (third pitch p43, third bonding length b43, and the third neighbor distance n43) will be varied to achieve a pre-determined set of mechanical properties of the ribbons such as strength, flexibility or rigidity and achieving a target production cost and capability.

In addition, drawing a curve passing through the nearest neighboring regions of the plurality of second bonding regions 35 results in a third pattern 43. In the illustration, the third pattern 43 comprises a wave pattern. The wave pattern of the third pattern 43 may be described using the third pitch p43, third bonding length b43, and the third neighbor distance n43. Alternately, the wave pattern may be described using the wavelength (third pitch p43) and a third amplitude a43 along with the third bonding length b43. In various embodiments, the pattern formed by the second bonding regions 35 may comprise any type of waves such as square waves, sine waves, cosine waves, triangular waves, and others.

However, in various embodiments, the first bonding regions 30 may be arranged in other patterns. Some of these alternate patterns will be described further in subsequent embodiments.

In the embodiment illustrated in FIG. 5A, the third pattern 43 has the same phase as the first pattern 41 and the third pitch p43 has the same pitch as the first pitch p41 of the first pattern 41 that describes the first bonding regions 30 on the first side 21 of the flexible ribbon assembly 25. Additionally, in this embodiment, the third amplitude a43 of the third pattern 43 is less than the first amplitude a41 of the first pattern 41. In other embodiments, the third amplitude a43 of third pattern 43 may be varied to achieve different properties of the flexible ribbon assembly 25 such as flexibility or bonding strength.

Figure 6A:
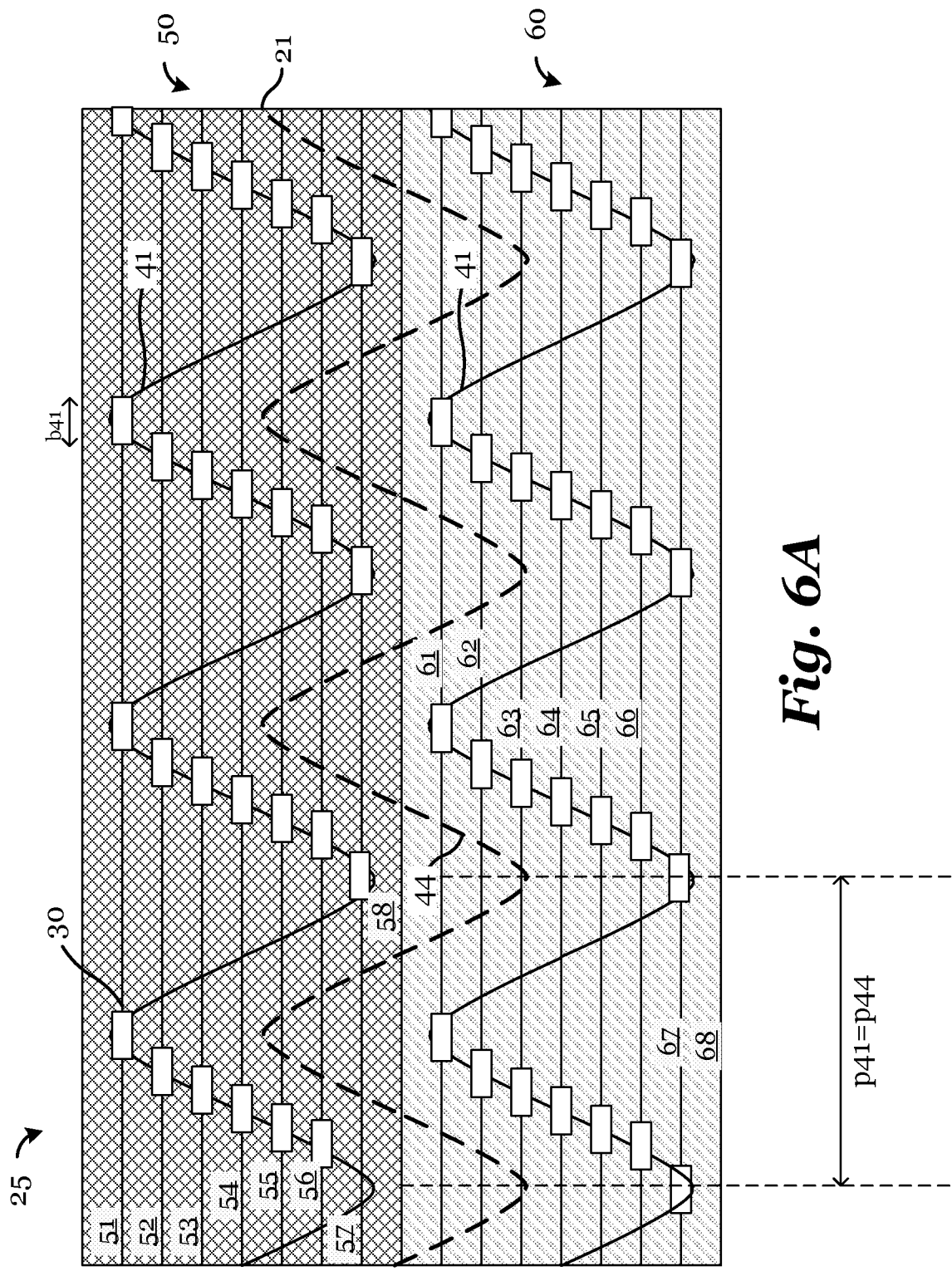
Figure 6B:
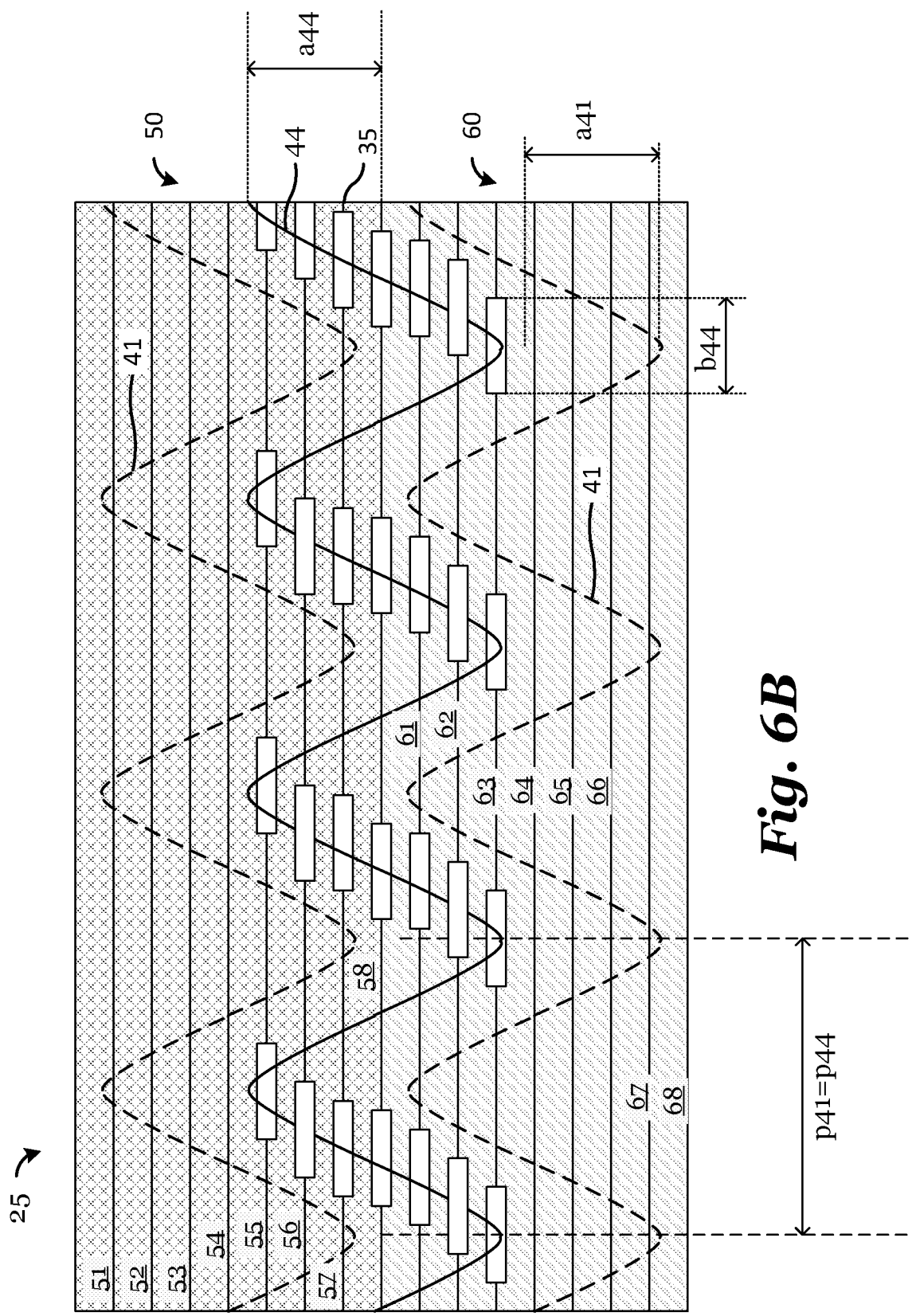

FIGS. 6A-6C illustrates a unitized flexible ribbon of an optical cable in accordance with an alternative embodiment of the present application, wherein FIG. 6A illustrates a top view of a unitized flexible ribbon comprising intermittent bonding regions having yet another alternative pattern, wherein FIG. 6B illustrates a bottom view of the unitized flexible ribbon illustrating the intermittent bonding regions, and wherein FIG. 6C illustrates a bottom view of the unitized flexible ribbon illustrating the intermittent bonding regions in an alternative embodiment;

This embodiment may be similar to the embodiment described using FIGS. 5A-5B, except that the plurality of second bonding regions 35 is arranged in a different wave pattern illustrated schematically as the fourth pattern 44. In particular, in this embodiment, the fourth pattern 44 has the same phase, pitch, and amplitude as first pattern 41. Therefore, as illustrated in FIG. 6B, the first amplitude a41 is the same as the fourth amplitude, while the first pitch p41 is the same as the fourth pitch p44.

In contrast to FIG. 6B, in FIG. 6C, the fourth pattern 44 has the same pitch and amplitude as the first pattern 41. However, relative to the first pattern 41 (illustrated, for example, in FIG. 5A), the duty cycle has a phase difference. This is also evident from comparing FIGS. 6B and 6C, the duty cycle of the embodiment of FIG. 6C has a 180° phase difference with the duty cycle of the embodiment of FIG. 6B.

As a further illustration, the first bonding regions 30 on the first side 21 and the second bonding regions 35 on the second side 22 of the embodiment of FIGS. 6A-6C have different bonding lengths. In the illustrated embodiment of FIGS. 6A and 6B, the first bond length b41 is substantially different from the fourth bonding length b44. In one embodiment as illustrated in FIGS. 6B-6C, the fourth bonding length b44 is longer than the first bonding length b41, for example, by 20%. In another embodiment, the fourth bonding length b44 is shorter than the first bonding length b41.

Figure 7A:
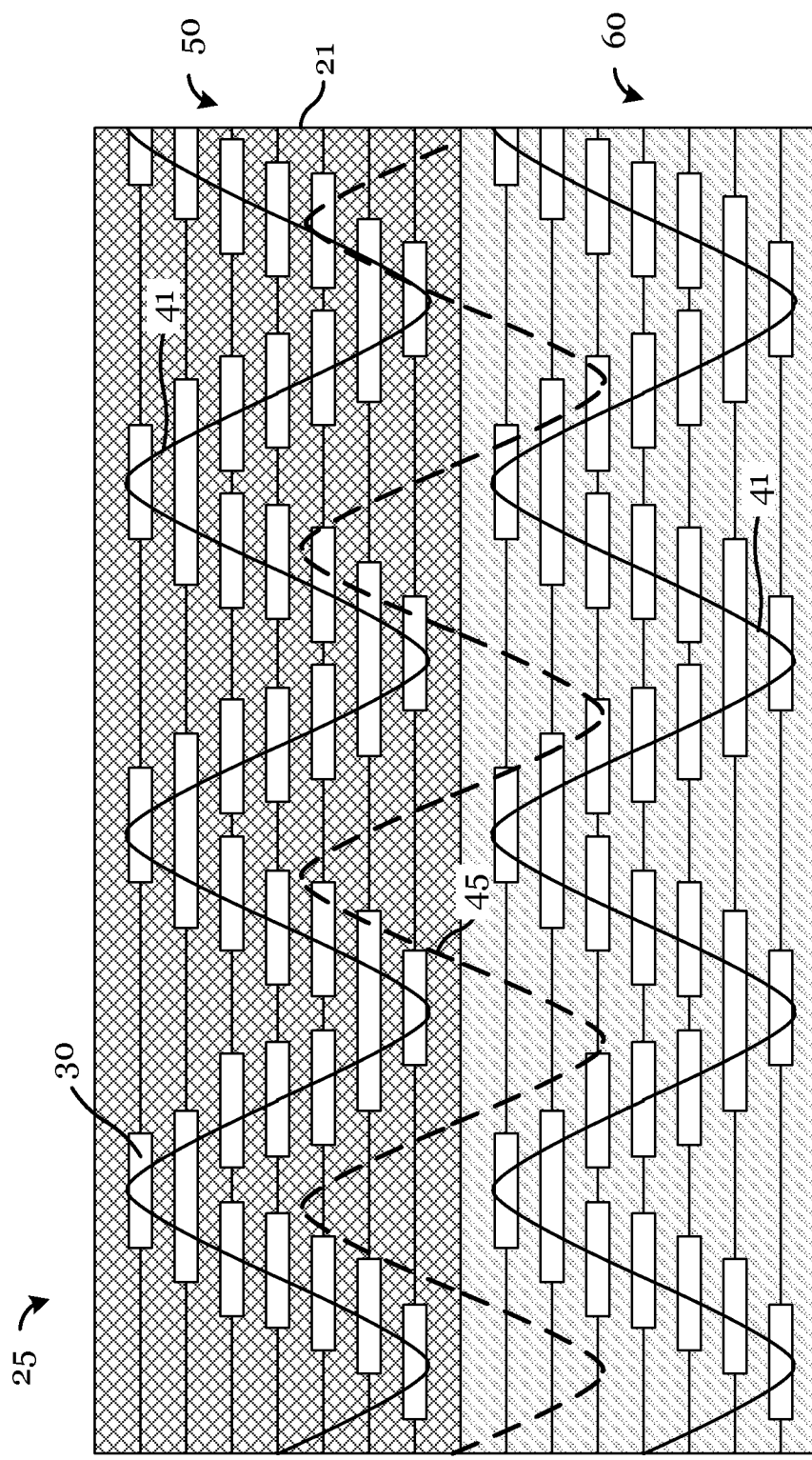
Figure 7B:
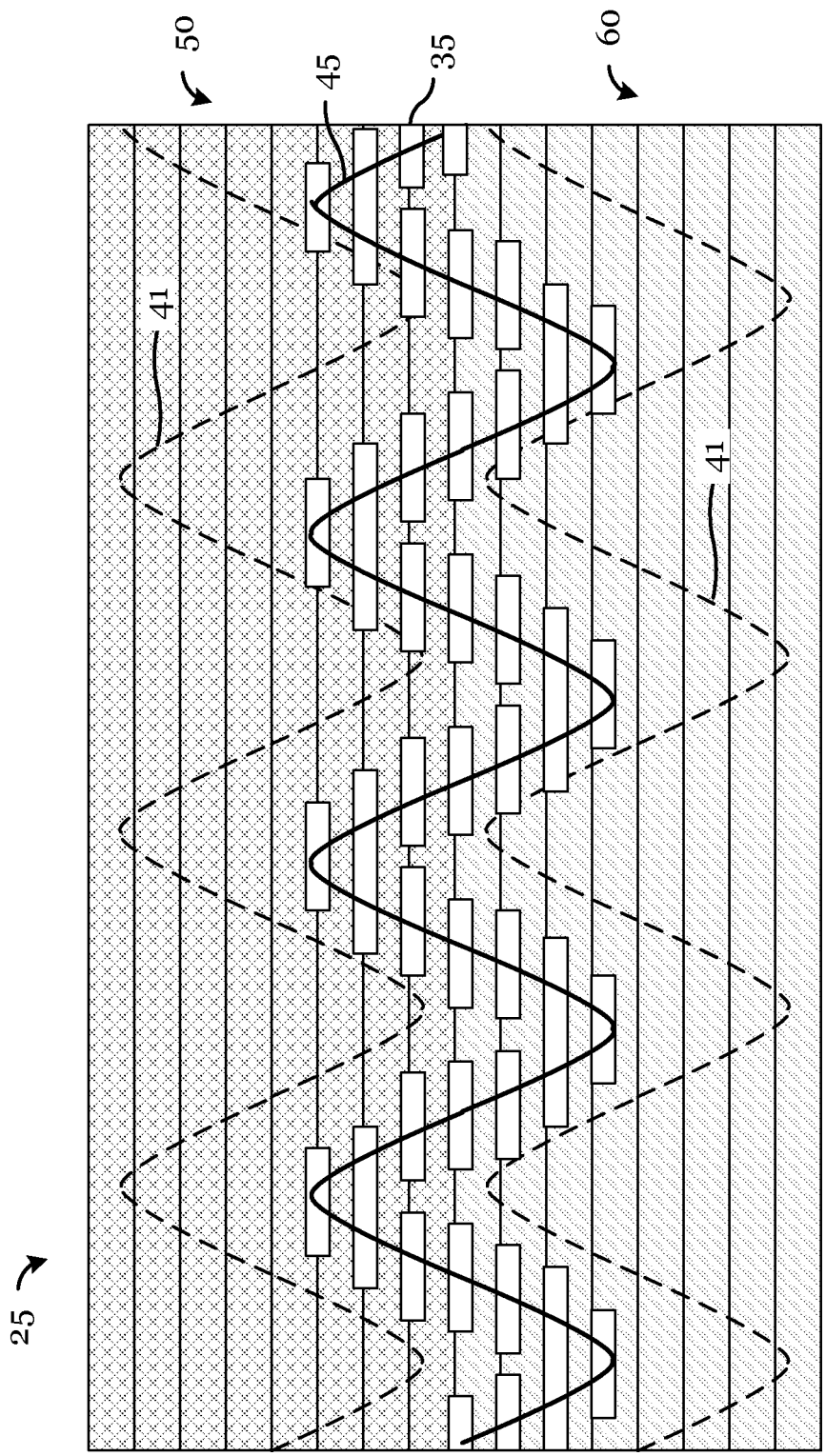

FIGS. 7A-7B illustrates a unitized flexible ribbon of an optical cable in accordance with an alternative embodiment of the present application, wherein FIG. 7A illustrates a top view of a unitized flexible ribbon comprising intermittent bonding regions having yet another alternative pattern, and wherein FIG. 7B illustrates a bottom view of the unitized flexible ribbon illustrating the intermittent bonding regions;

In contrast to the prior embodiments, in this embodiment, the bonding regions are arranged with a 100% duty cycle. See, for example, the first bonding regions 30 on the first side 21 of the flexible ribbon assembly 25 in FIG. 7A and the second bonding regions 35 on the second side 22 of the flexible ribbon assembly 25 in FIG. 7B. Consequently, due to the wave like pattern of the first pattern 41 and the fifth pattern 45, in this embodiment, the optical fibers in the central region of the flexible are more rigidly attached than the optical fibers at the outer periphery of the wave pattern. For example, as a consequence, the attachment between the first flexible ribbon 50 and the second flexible ribbon 60 may be stronger at the point of intersection between these ribbons. In a further embodiment, the first bonding regions 30 may be arranged at a duty cycle of 50% (e.g., as in FIGS. 1A, 2A, 3A, 4A, 5A, 6A) while the second bonding regions may be arranged at a duty cycle of 100%.

In addition, the fifth pattern 45 illustrated in FIG. 7B may have a different phase from the first pattern 41 illustrated in FIG. 7A while retaining the similar pitch and amplitude as the first pattern 41.

FIGS. 8A-8D illustrate top views of an unitized flexible ribbon in accordance with various alternative embodiments of the present application. A corresponding bottom view is not illustrated but the dashed lines illustrate the features on the opposite side.

Figure 8A:
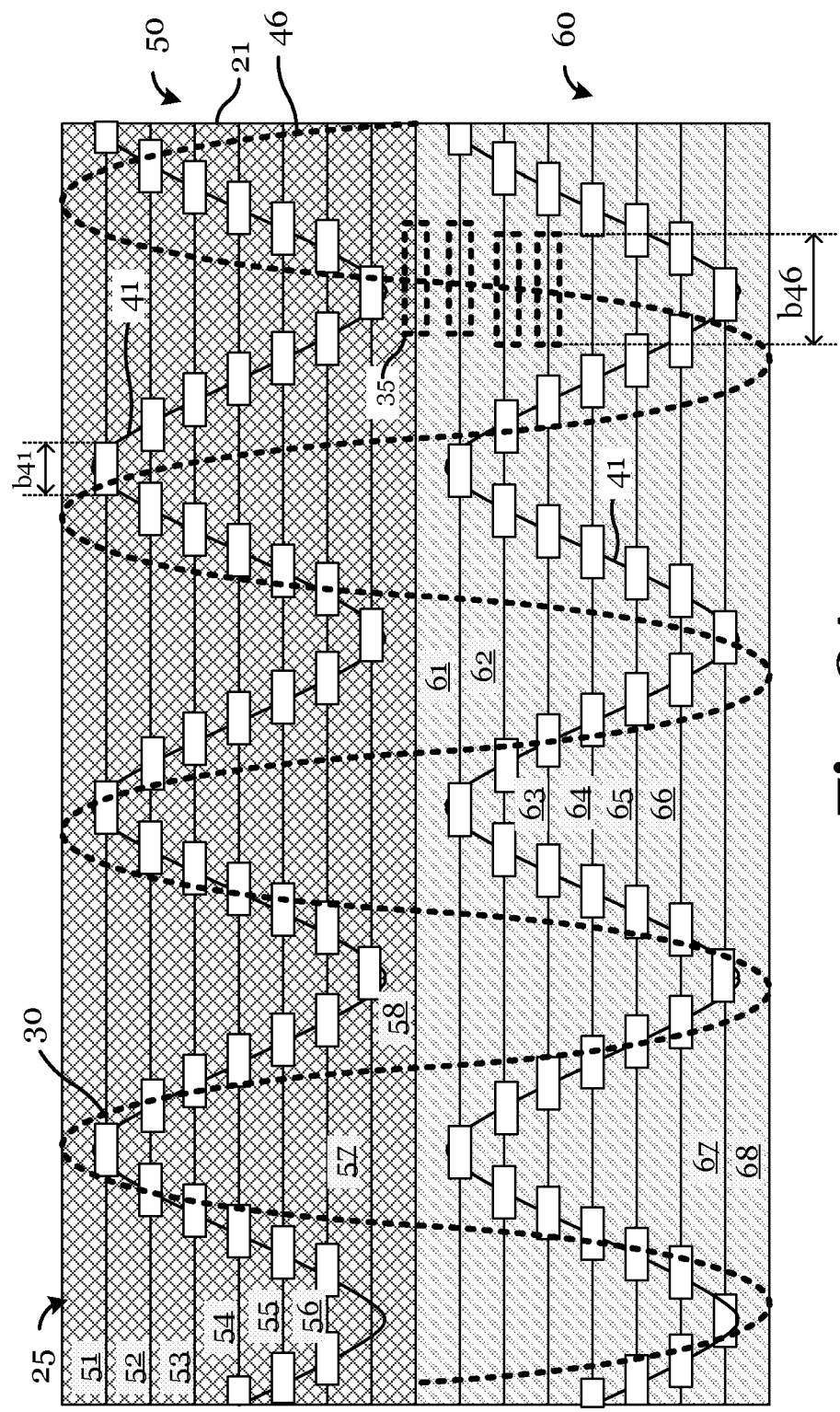
Figure 9B:
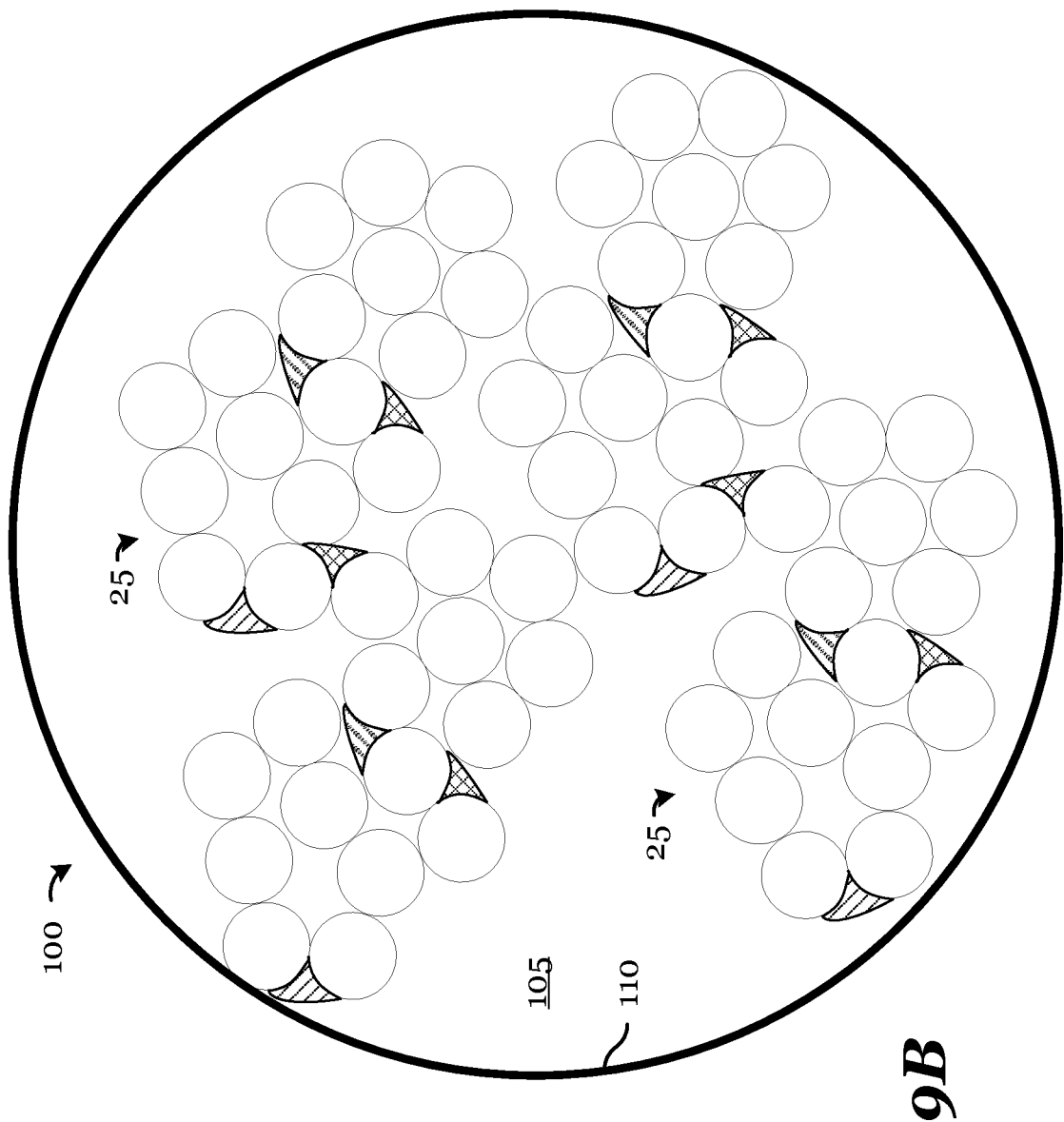
Figure 9C:
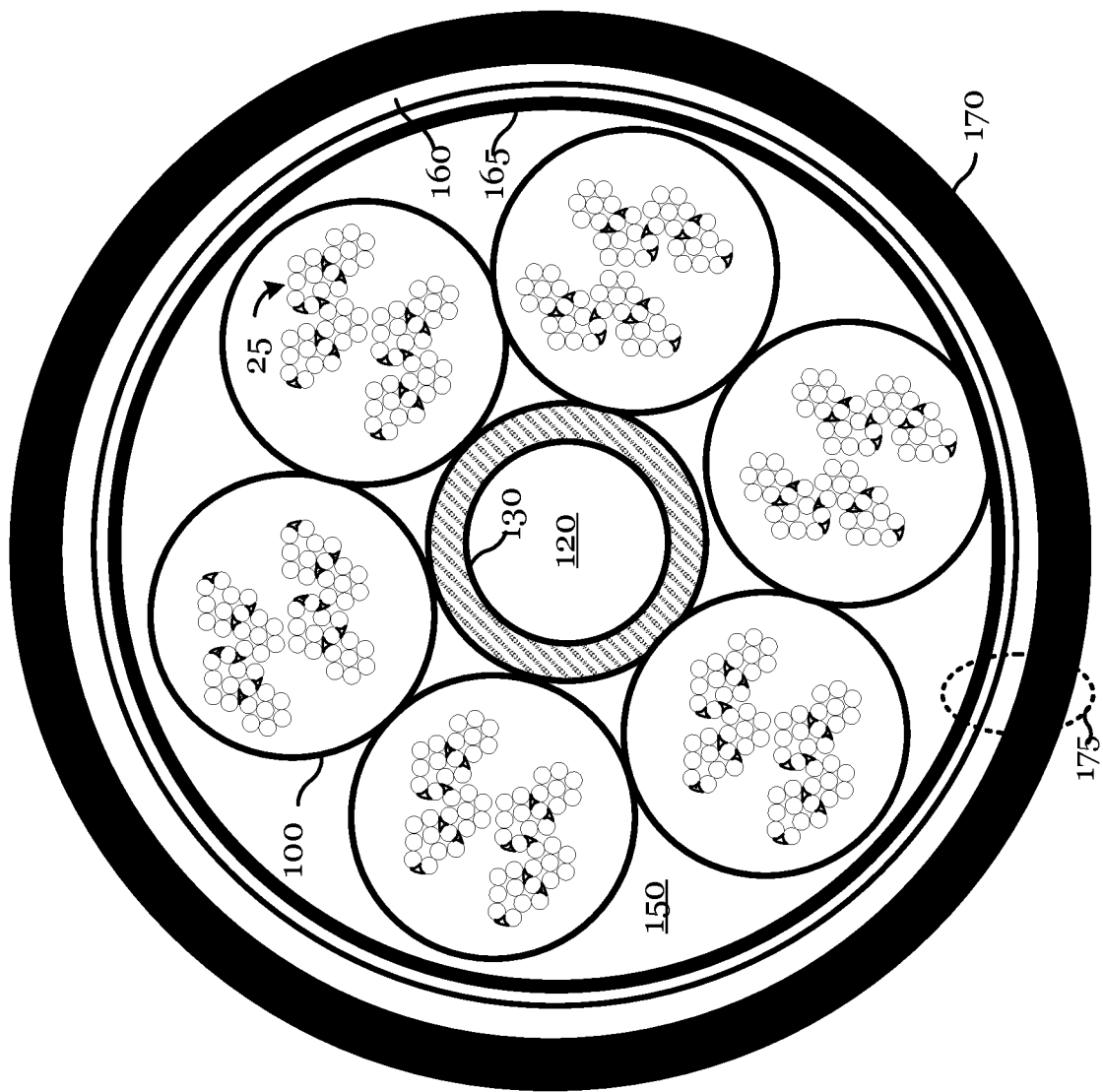

Referring to FIG. 8A, a plurality of second bonding regions 35 is arranged in another alternative sixth pattern 46. For clarity only a few of the plurality of second bonding regions 35 are illustrated in FIG. 8A.

The sixth pattern 46 has a larger amplitude than those illustrated in earlier embodiments so that a plurality of second bonding regions 35 is applied across the junctions of every (or almost all) optical fiber on the bottom side of the flexible ribbon assembly 25. In this embodiment, the first bond length b41 of the first bonding regions 30 may be substantially equal to the sixth bond length b46 of the second bonding regions 35. In other embodiments, the first bond length b41 of the first bonding regions 30 may be different from the sixth bond length b46 of the second bonding regions 35. Although the first bonding regions 30 are arranged with a duty cycle of 100% along the first pattern 41, in other embodiments, a different duty cycle may be chosen. Some options include 25%, 50%, and 75%.

Figure 8B:
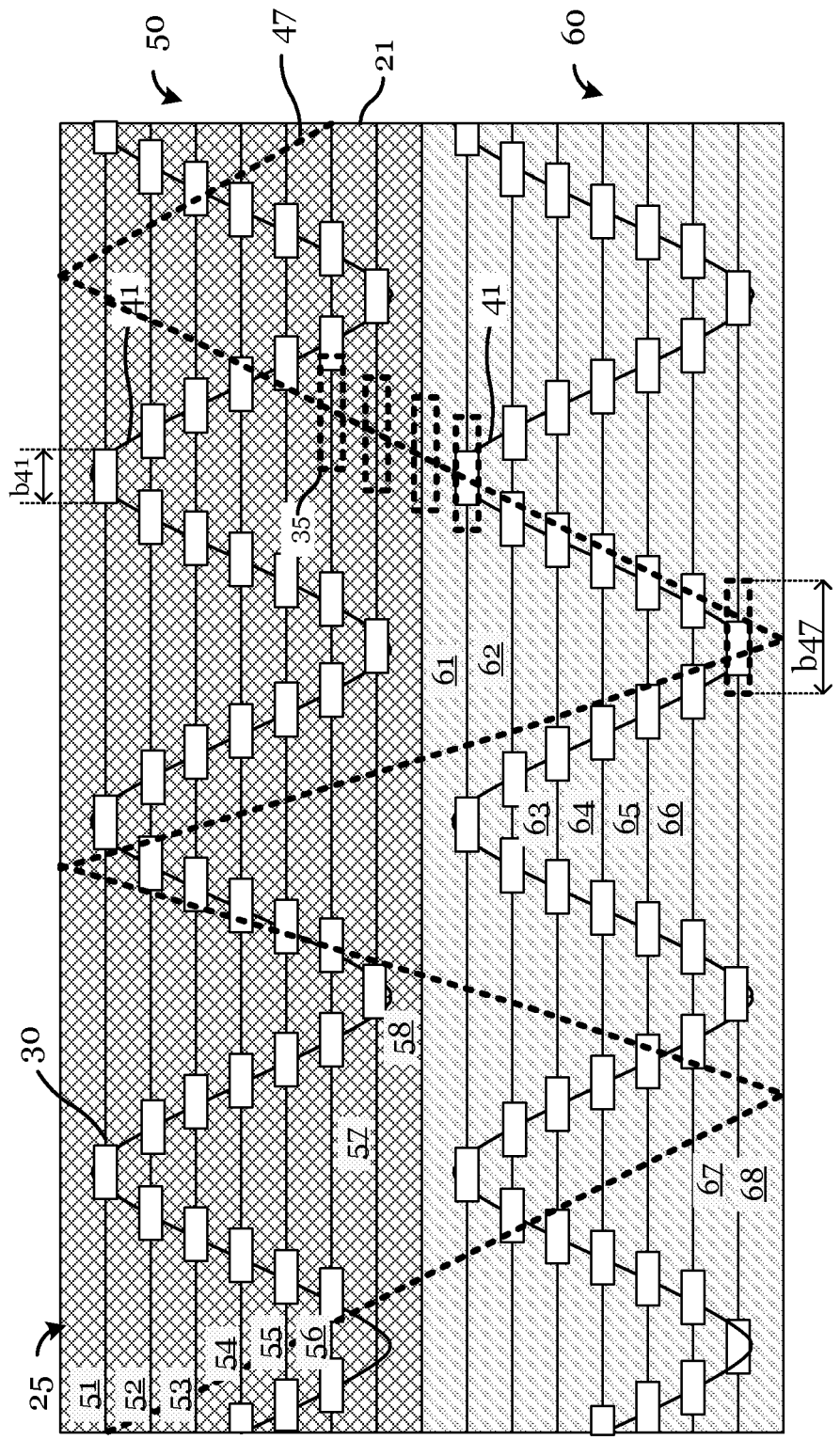

FIG. 8B illustrates an additional alternative embodiment of the present application with a "zigzag" pattern. Referring to FIG. 8B, a plurality of second bonding regions 35 is arranged in another alternative seventh pattern 47. Again, for clarity only a few of the plurality of second bonding regions 35 are illustrated in FIG. 8B.

In one embodiment, the seventh pattern 47 may have a large amplitude so that the intersecting junctions of every (or almost all) optical fibers on the bottom side of the flexible ribbon assembly 25 is attached using one of the plurality of second bonding regions 35. In FIG. 8B, the seventh pattern 47 traverses the entire width of the flexible ribbon assembly 25.

In one embodiment, the first bond length b41 of the first bonding regions 30 may be substantially equal to the seventh bond length b47 of the second bonding regions 35. In other embodiments, the first bond length b41 of the first bonding regions 30 may be different from the seventh bond length b47 of the second bonding regions 35. Additionally, other embodiments may comprise further alternative irregular zigzag patterns describing the application of the plurality of second bonding regions 35.

Figure 8C:
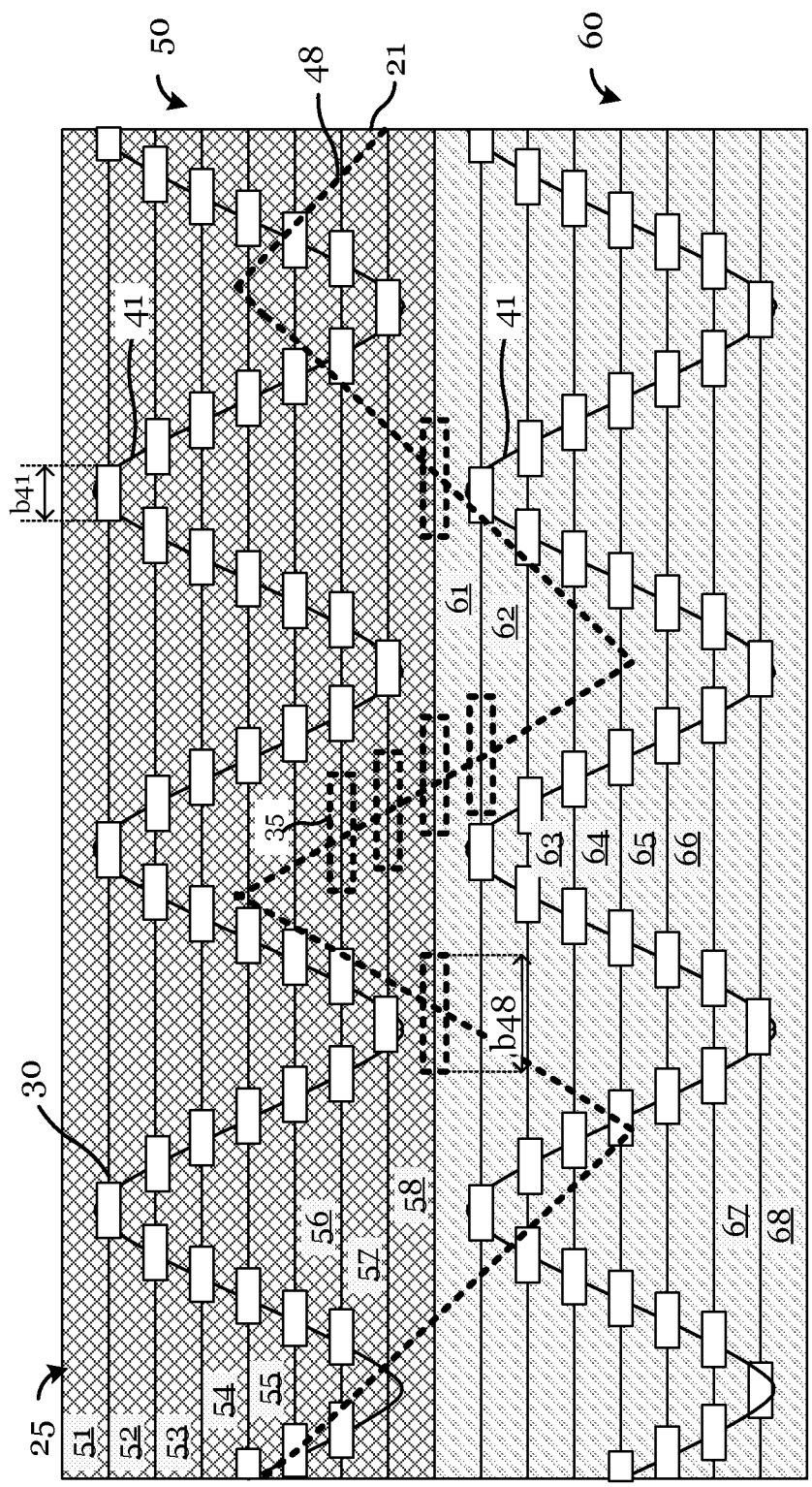

Alternatively, as illustrated in FIG. 8C, in other embodiments, the pattern of the plurality of second bonding regions 35 may have a smaller amplitude than illustrated in FIG. 8B. Accordingly, the eighth pattern 48 only covers a portion of the width of the flexible ribbon assembly 25. As illustrated, the eighth bond length b48 may be larger than the first bond length b41 in one embodiment.

As FIGS. 8B-8C illustrate, the seventh and eighth patterns 47 and 48 do not have a proper wave shape or a repeating triangular shape. Accordingly, in various embodiments, second bonding regions 35 may be applied intermittently by other irregular patterns with varying amplitudes, pitches, and phases.

Figure 8D:
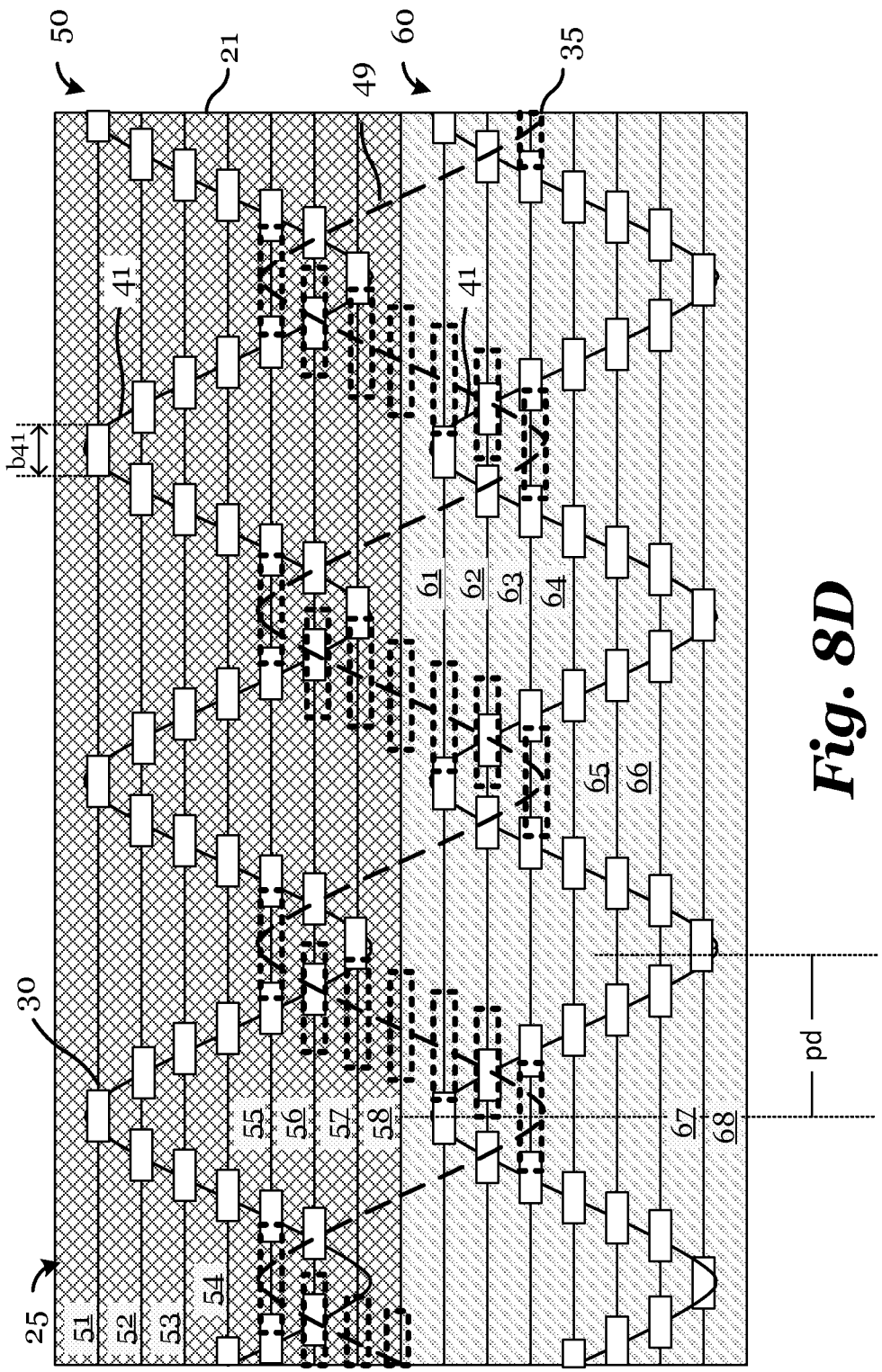

FIG. 8D illustrates another alternative embodiment of the present application wherein the second bonding regions 35 are applied intermittently on the second side 22 of the flexible ribbon assembly 25 forming a wavelike ninth pattern 49. As the figure illustrates, the ninth pattern 49 has a constant phase difference with the first pattern 41 on the first side 21. In the illustrated embodiment, the duty cycle of the ninth pattern 49 is 50% although other values are possible in other embodiments.

Figure 8E:
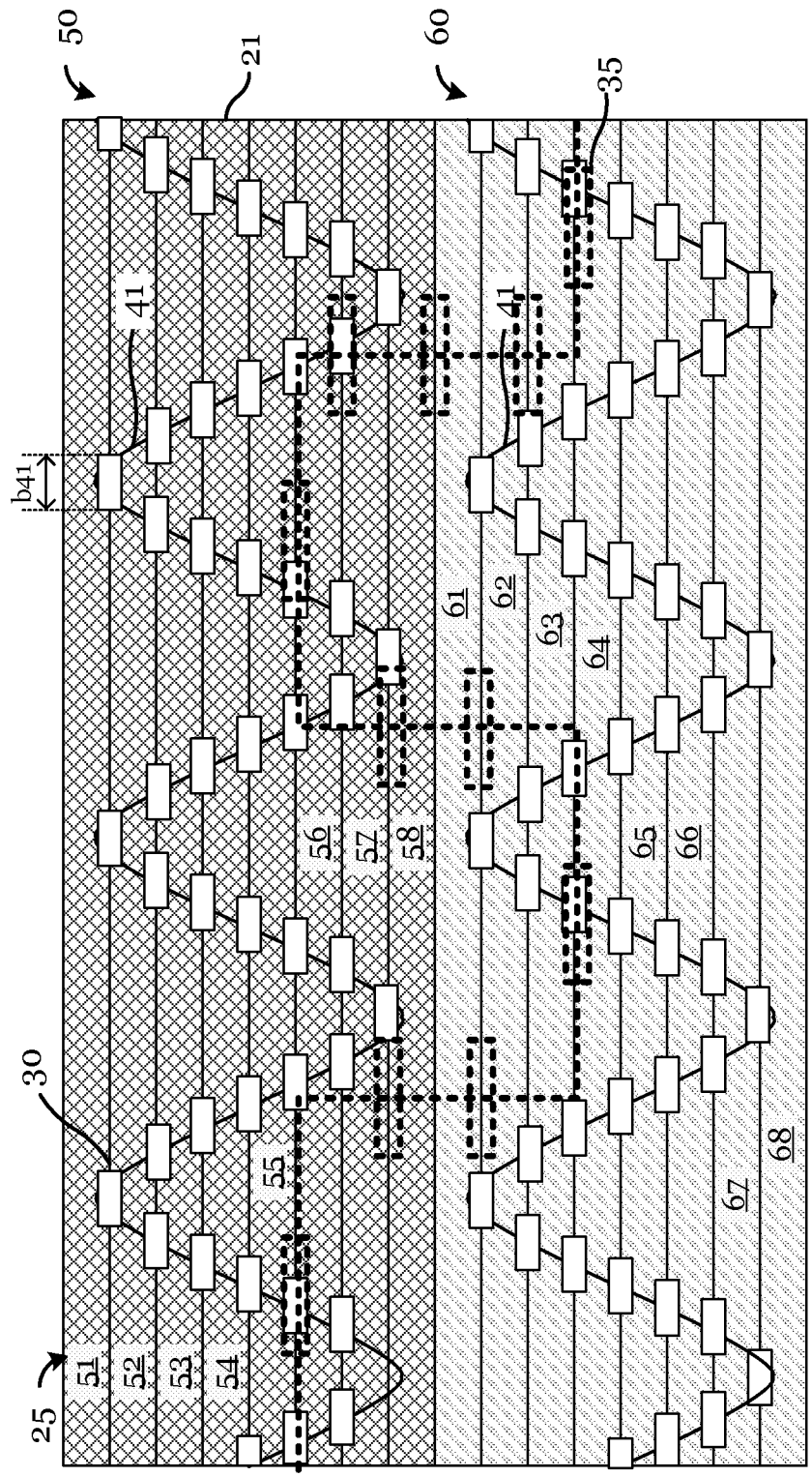

FIG. 8E illustrates another alternative embodiment of the present application wherein the second bonding regions 35 are applied intermittently on the second side 22 of the flexible ribbon assembly 25 forming a square wave. In various embodiments, the pattern formed by the second bonding regions 35 may comprise any type of waves such as square waves, sine waves, cosine waves, triangular waves, and others. For illustration, a square wave is used in FIG. 8E. The second bonding regions 35 are arranged at 50% duty cycle for illustration alternating between the intersecting regions.

FIGS. 9A-9C illustrate the application of embodiments of the present application to the formation of optical cables. Although any type of optical cable may use the unitized flexible ribbon, one illustrated is provided using FIGS. 9A-9C. Accordingly, FIG. 9A illustrates a folded unitized flexible ribbon, while FIG. 9B illustrates a cross-sectional view of a buffer tube formed using a plurality of flexible ribbon assemblies and FIG. 9C illustrates a cross-sectional view of the optical cable comprising a plurality of buffer tubes of FIG. 8B.

Referring to FIG. 9A, as described in various embodiments above, a plurality of optical fibers are arranged parallel to each other and are connected at first bonding regions 30 and second bonding regions 35. As previously discussed, the first and second bonding regions 30 and 35 are arranged intermittently across the flexible ribbons so as to selectively leave a large surface of the optical cables free of the bonding material. Consequently, the plurality of optical fibers maintains a large degree of freedom and can be effectively folded or otherwise randomly positioned when the ribbon is subjected to external stress.

In various embodiments, the plurality of optical fibers can be folded into a densely packed configuration. In one or more embodiments, the folded optical fibers may have a non-circular or irregular shape. In contrast, ribbons that are encapsulated cannot be folded efficiently due to their excessive rigidity.

FIG. 9B illustrates a buffer tube comprising a plurality of flexible ribbon assemblies in accordance with an embodiment of the present application. In one embodiment, the buffer tube may be a deformable buffer tube that has been deformed during the formation of the optical cable. In other embodiments, the buffer tube may be a non-deformable buffer tube that maintains a circular shape with the optical cable.

The flexible ribbon assemblies 25 comprise two or more flexible ribbons formed as described in various embodiments above. The flexible ribbon assemblies 25 are enclosed by a buffer tube jacket 110. In one or more embodiments, the buffer tube jacket 110 comprises polypropylene, cellular polypropylene, polyethylene, nylon, or other materials.

In addition, the flexible ribbon assemblies 25 may be dispersed within a gel 105 that allows the flexible ribbon assemblies 25 to move around relative to each other. Further, the thickness of the buffer tube jacket 110 is maintained to enable the flexibility of the ribbons.

During the formation of the optical cable, the buffer tube may be subjected to compressive stress. Buffer tubes may show increased deformation under an equivalent stress due to the temperature dependent modulus reduction during jacketing. As a consequence, the flexible ribbon assemblies 25 within the buffer tube 100 may rearrange the shape/configuration to compensate or minimize this compressive stress.

The rearrangement of the flexible ribbon assemblies 25 within the optical cable does not result in twisting or bending of the optical fibers. Therefore, embodiments of the present application achieve improved packing density without compromising on mechanical or optical characteristics of the optical cable.

The foldable flexible ribbon assemblies 25 are run lengthwise along each buffer tube 100, and each flexible ribbon such as the first flexible ribbon 50 and the second flexible ribbon 60 is allowed to take a random configuration. Subsequent twisting, if any, of the plurality of buffer tubes 100 while forming the cable is sufficient to average strain across the optical fibers and meet mechanical and optical standards for the fiber optic cable.

Although, in FIG. 9B, only two flexible ribbon assemblies 25 are shown to be within the buffer tube 100, in various embodiments, the buffer tube 100 may include a much larger or even a smaller number of flexible ribbon assemblies 25. For example, in one embodiment, the buffer tube 100 may comprise twelve or twenty four flexible ribbon assemblies 25. In addition, each of the flexible ribbon assemblies 25 may include any suitable number of flexible ribbons such as the first flexible ribbon 50 and the second flexible ribbon 60. Each flexible ribbon may similarly have any number of optical fibers. The optical fibers may have a diameter in the range of 100 µm to 300 µm in various embodiments. For example, each of the flexible ribbons may include twelve optical fibers in one illustration. Therefore, in this example, the buffer tube 100 includes 288 or 576 optical fibers.

FIG. 9C illustrates a cross-sectional view of an optical cable implementing embodiments of the present application.

Embodiments of the present application may be implemented in many types of optical cables. However, for illustration, a particular optical cable is illustrated. Referring to FIG. 9C, the optical cable includes a rigid central strength member 120. An upjacket 130 surrounds the central strength member 120. The outer cover 175 of the optical cable may include several layers such as a water blocking layer 165, and an optional outer strength member 160 that may include a steel armor, and an outer jacket 170.

The optical cable further includes buffer tubes 100 that contain multiple flexible ribbon assemblies 25 comprising a plurality of optical fibers. The flexible ribbon assemblies 25 are arranged into a buffer tube 100 as previously described. The buffer tube 100 may have a rigid round shape or may be a deformable buffer tube that conforms to the shape of the arrangement of the flexible ribbon assemblies 25. The space 150 between the buffer tubes 100 may be void or alternately filled with a suitable fill material.

In various embodiments, the optical cable may be designed to be compatible with one or more standards.

FIGS. 10A-E illustrate a unitized flexible ribbon during various stages of fabrication in accordance with embodiments of the present application featuring a method with a moving ribbon or ribbon assembly.

Figure 10A:
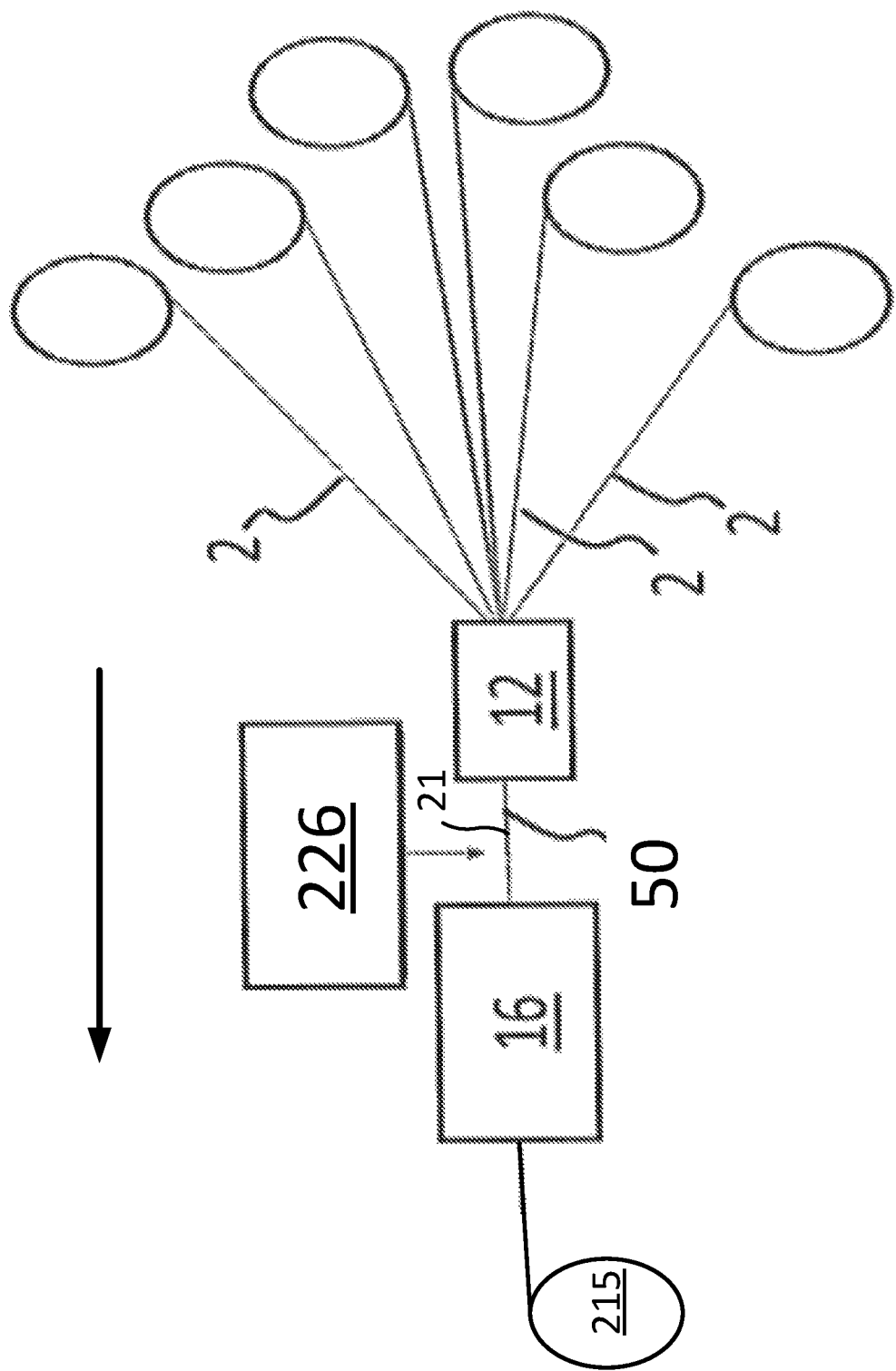

FIG. 10A illustrates a schematic system diagram illustrating the formation of a flexible ribbon from a plurality of optical fibers in accordance with embodiments of the present invention.

A plurality of optical fibers 2 (individual optical fibers such as the first set of optical fibers 51-58) are paid off from reels and fed, into a first die 12, providing a longitudinal optical fiber assembly 25 so that the plurality of optical fibers 2 are in parallel and adjacent to each other. The arrow direction shows the motion of the optical fibers 2 during the processing.

A first dispensing device 226 applies a bonding material, such as an UV curable resin, to the surface of the optical fiber assembly 25 at the first side 21. The bonding material may also be a thermoplastic material so that the first dispensing device 226 applies a thread of the thermoplastic material to the surface of the optical fiber assembly 25. For example, the thermoplastic material may be heated to above its softening point and formed into a thread, and the softened thermoplastic thread may be applied to the surface of the optical fiber assembly 25. After cooling, the applied thermoplastic thread forms the first bonding regions described in various embodiments.

When a curing process is desired, the optical fiber assembly 25 with the applied bonding material is then passed through a first curing station 16, and thereafter the flexible ribbon assembly 50 is then picked up on a pick-up reel 215.

Figure 10B:
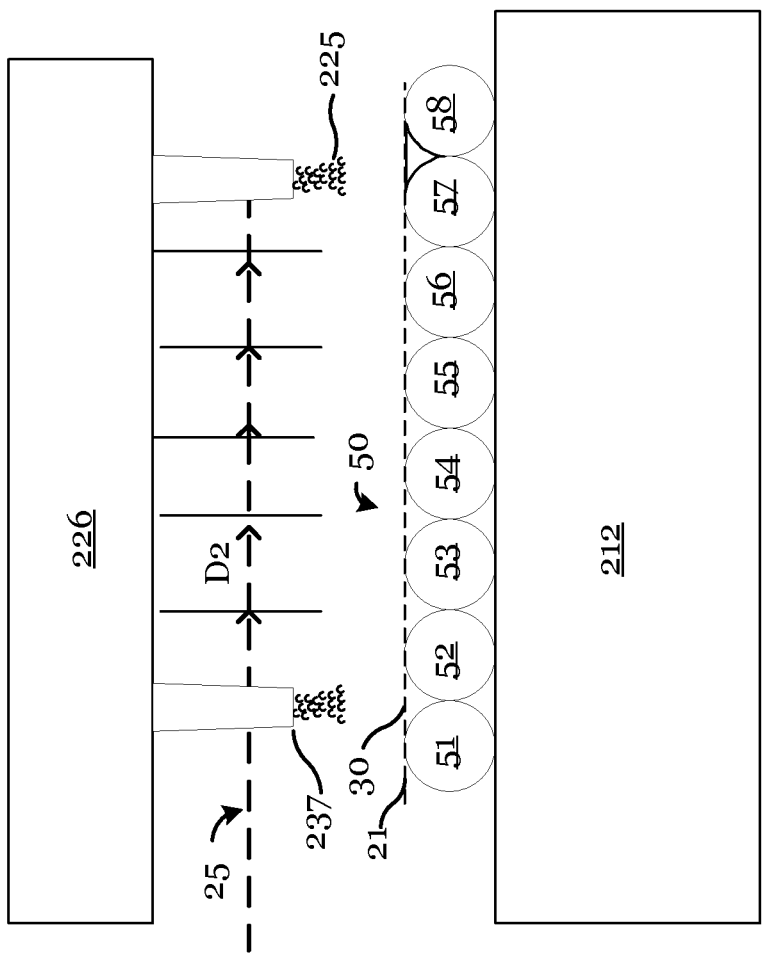

FIG. 10B illustrates a magnified view of the plurality of flexible ribbons in the method described above in FIG. 10A.

Referring to FIG. 10B, a plurality of flexible ribbons such as the first flexible ribbon 50 is formed, for example, sequentially. As illustrated, the first set of optical fibers 51-58 are paid off from reels and positioned parallel to each other on a first moving carrier 212. The first moving carrier 212 may comprise a conveyer belt, or any other suitable construction. Alternately, the first set of optical fibers 51-58 may be suspended freely while being supported by rollers, which may also provide the translational movement of the optical fibers along their length.

Each of the first set of optical fibers 51-58 are arranged parallel to each other during this process, for example, extending into the plane of paper in FIG. 10B. The first set of optical fibers 51-58 have a first side 21 facing away from the first moving carrier 212.

The first moving carrier 212 with the parallel optical fibers 51-58 arranged on top of it is passed through a first dispensing device 226. A first moving nozzle 237 is positioned over the first set of optical fibers 51-58. Matrix material 225 is applied from the first dispensing nozzle 237 on the intersecting junctions between the optical fibers. The matrix material 225 fills the gap between the adjacent optical fibers and after curing forms first bonding regions 30.

In various embodiments, the matrix material 225 may comprise a resin, acrylic-based adhesive, including UV curable acrylate materials, other polymeric materials, thermoplastic materials.

The first moving nozzle 237 may be oscillating (or may be stationary when dispensing a bead of material between two flexible ribbons) in a direction transverse to the direction of the longitudinal passing fibers or ribbons. In other words, the first moving nozzle 237 may be oscillating along the longitudinal direction D2 in FIG. 10B or into the plane in FIG. 10A.

Alternately, the matrix material 225 is dispensed for a short time before the first moving nozzle 237 within the first dispensing device 226 shuts it off. For example, the matrix material 225 is released while the first set of optical fibers 51-58 moves along a longitudinal direction, which is out of the plane of the page in FIG. 10B. Subsequently, the first moving nozzle 237 is shut off so that the matrix material 225 is not released.

The first moving nozzle 237 is then moved relative to the first moving carrier 212 along a direction D2, transverse to the longitudinal direction along the optical fibers, to move to the next intersecting junction of the first set of optical fibers 51-58. Further, translation of the first set of optical fibers 51-58 may continue while the first moving nozzle 237 is closed. Subsequently, the first moving nozzle 237 is opened again and the matrix material 225 is released at the intersecting junction between adjacent optical fibers while moving the first set of optical fibers 51-58 along the longitudinal direction. The first moving nozzle 237 may thus step through the first set of optical fibers 51-58 until the matrix material 225 for forming the predetermined pattern of the first bonding regions 30 has been released.

The matrix material 225 is then cured to form the first flexible ribbon 50 comprising the first bonding regions 30 having the first pattern 41, for example. The curing process may comprise passing through a first curing station 16, a room temperature cure for a predetermined time, higher temperature cure (e.g., 50° C. to 300° C.), exposure to UV-light, and others.

The first dispensing device 226 may be configured to apply the matrix material 225 on to the second set of optical fibers 61-68 after forming the first flexible ribbon 50. For example, the first flexible ribbon 50 may be removed from the first moving carrier 212 by a pickup reel and the second set of optical fibers 61-68 arranged on the first moving carrier 212. The steps of releasing the matrix material 225 may be repeated as described above while forming the first flexible ribbon 50 (see also schematic arrows showing the same).

Accordingly, a plurality of flexible ribbons such as the first flexible ribbon 50 (as well as subsequently the second flexible ribbon 60) is formed.

Figure 10C:
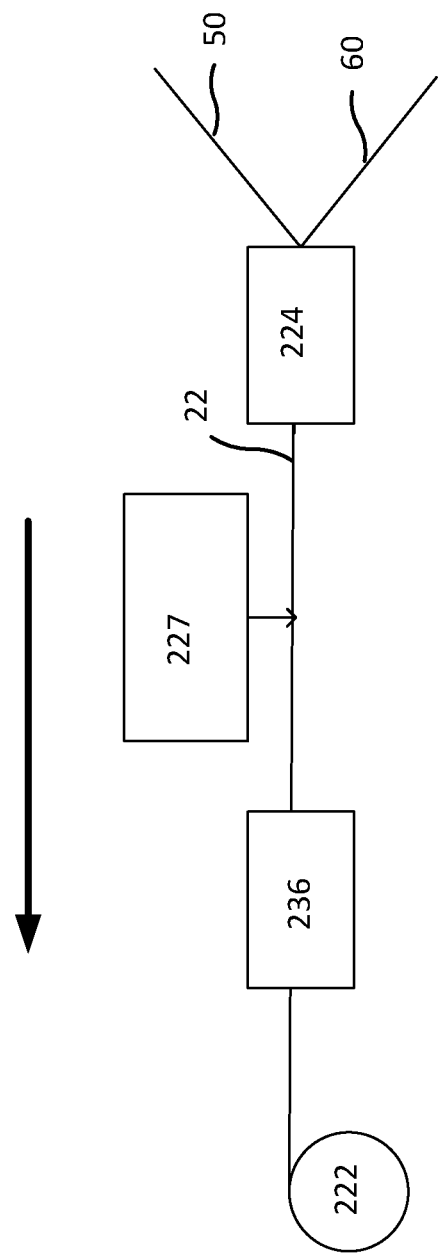
Figure 10D:
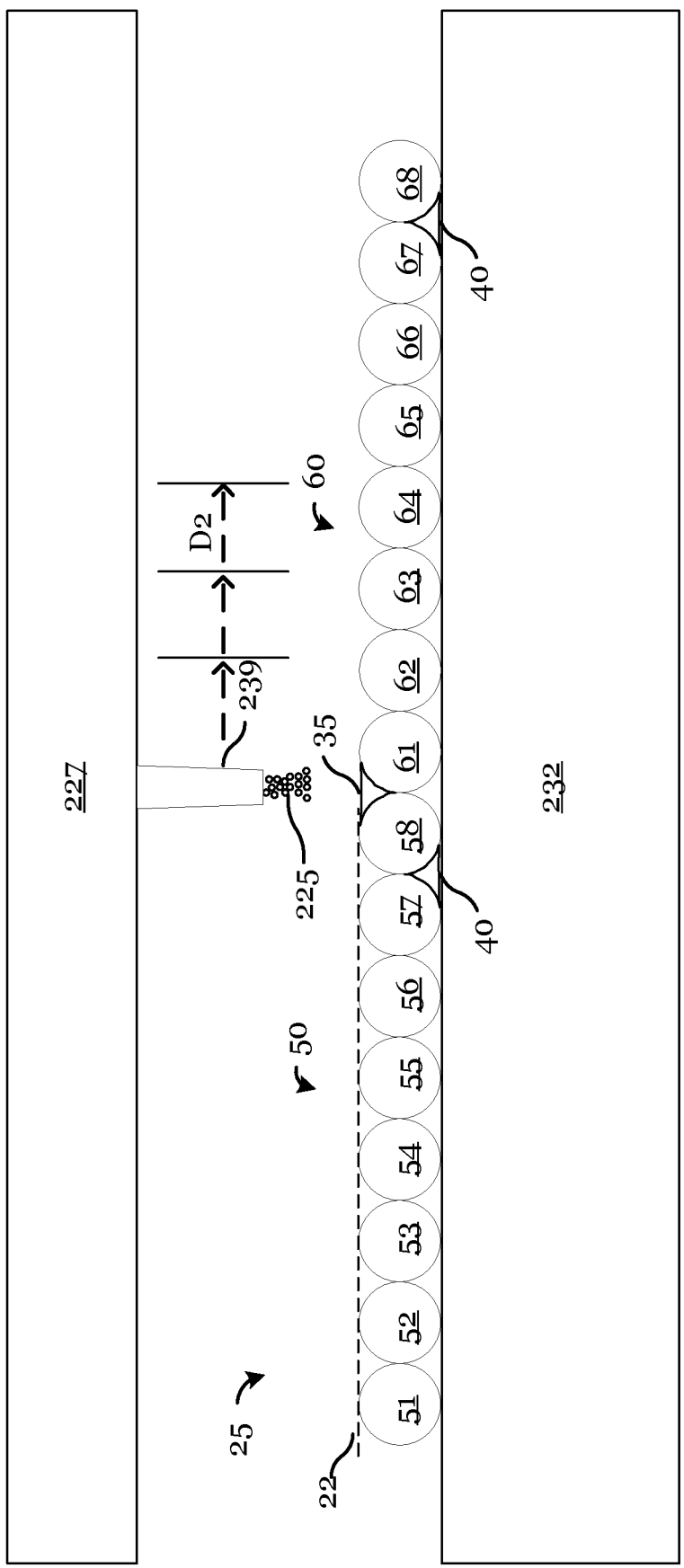
Figure 10E:
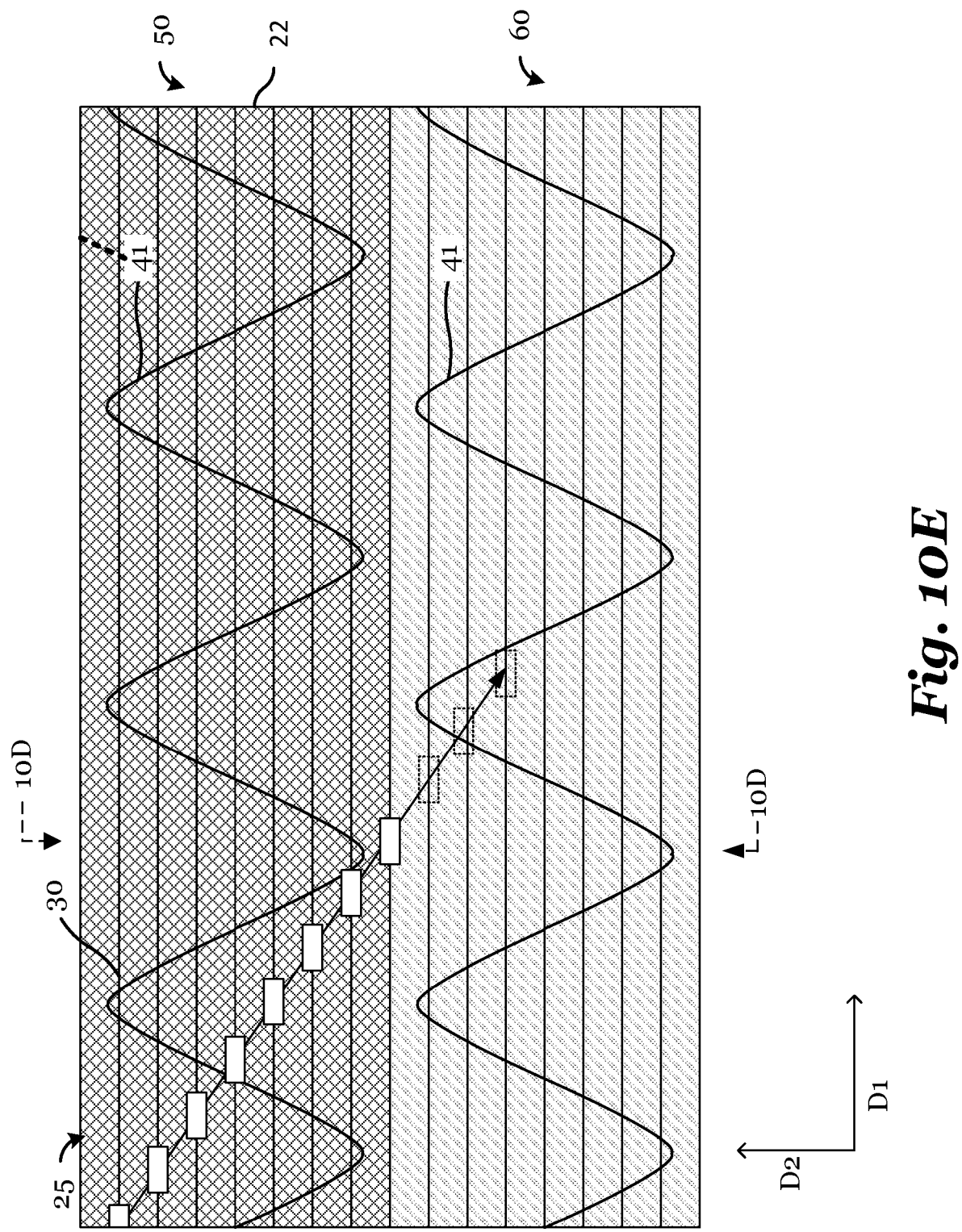

FIGS. 10C-10E illustrate the unitized flexible ribbon during formation in accordance with embodiments of the present application. FIG. 10C (similar to FIG. 10A) illustrates the formation of a flexible ribbon assembly from a plurality of flexible ribbons in accordance with embodiments of the present invention. FIG. 10D illustrates a cross-sectional view of the plurality of flexible ribbons during formation of second bonding regions at an opposite bottom side, and FIG. 10E illustrates a top view of the plurality of flexible ribbons during formation of second bonding regions at the bottom side along a predetermined pattern.

The plurality of flexible ribbons that are designed to be part of the unitized flexible ribbon such as the first flexible ribbon 50 and the second flexible ribbon 60 are paid off from reels, into a second die 224, and optionally arranged on a second moving carrier 232. In particular, the first flexible ribbon 50 and the second flexible ribbon 60 are arranged so that a second side 22 that is opposite the first side 21 comprising the first bonding regions 30 faces away from the second moving carrier 232. Alternately, the first flexible ribbon 50 and the second flexible ribbon 60 may be freely suspended between rollers, which may also provide translational motion along the length of the flexible ribbons (direction of arrow).

The second dispensing device 227 may be the same tool as the first dispensing device 226 used previously in one or more embodiments. Alternately, the second dispensing device 227 to form the unitized ribbon may be different than the first dispensing device 226. Similarly, the second moving carrier 232 may be the same or different from the first moving carrier 212 in various embodiments. Similarly, the matrix material 225 dispensed from the first dispensing device 226 may be different from the matrix material 225 disposed from the second dispensing device 227.

In embodiments such as the one described using FIG. 1A-1C, 2A-2B, or 3A-3C, a continuous flow of the matrix material 225 from the second dispensing device 227 is maintained as the second moving carrier 232 moves along a longitudinal direction parallel to the length of the first and the second flexible ribbons 50 and 60.

Even, in other embodiments that use intermittent bonding regions such as the illustration of FIG. 4B, the matrix material 225 may still be dispensed continuously. For example, in one illustration, a continuous sinusoidal thread of matrix material 225 is applied on the surface of the first flexible ribbon 50 and/or the second flexible ribbon 60. By selecting proper viscosity and surface tension, the bonding material forms discrete bonds between successive optical fibers even though applied continuously. Advantageously, continuous application of the matrix material 225 to form discrete or intermittent bonding regions is less complicated and therefore less expensive.

However, in other embodiments that use intermittent bonding regions such as the illustration of FIG. 4B, the matrix material 225 is dispensed for a short time before a second moving nozzle 239 within the second dispensing device 227 shuts it off. For example, the matrix material 225 is released while the second moving carrier 232 moves along a longitudinal parallel to the length of the optical fibers, which is out of the plane of the page in FIG. 10D. Subsequently, the second moving nozzle 239 is shut off so that the matrix material 225 is not applied. The second moving nozzle 239 is moved relative to the second moving carrier 232 along the transverse direction D2 to move to the next intersecting junction of the optical fibers. Further, another translation of the second moving carrier 232 along the longitudinal direction may also be performed while the nozzle is closed. Subsequently, after the translation of the second moving carrier 232 in the longitudinal direction and the translation of the second moving nozzle 239 in the transverse direction D2, the second moving nozzle 239 is opened again and the matrix material 225 is released at the intersecting junction between adjacent optical fibers while moving the second moving carrier 232 along the longitudinal direction. The second moving nozzle 239 may thus step through the first flexible ribbon 50 and the second flexible ribbon 60 until the matrix material 225 for forming the predetermined pattern of the second bonding regions 35 has been released. All the translations may be performed simultaneously or concurrently.

As previously described, the matrix material 225 is then cured, for example, in a second curing station 236 to form the flexible ribbon assembly 25. The flexible ribbon assembly 25 is then picked up from the second moving carrier 232 by a pick-up reel 222.

In accordance with the embodiments described previously, the second bonding regions 35 may be continuous or intermittent and may comprise different patterns, e.g., wavelike or linear pattern with a variety of regular or irregular wavelengths, amplitudes, and phases which may be controlled by the relative positions of the second moving nozzle 239 and second moving carrier 232 during the application process.

Figure 11A:
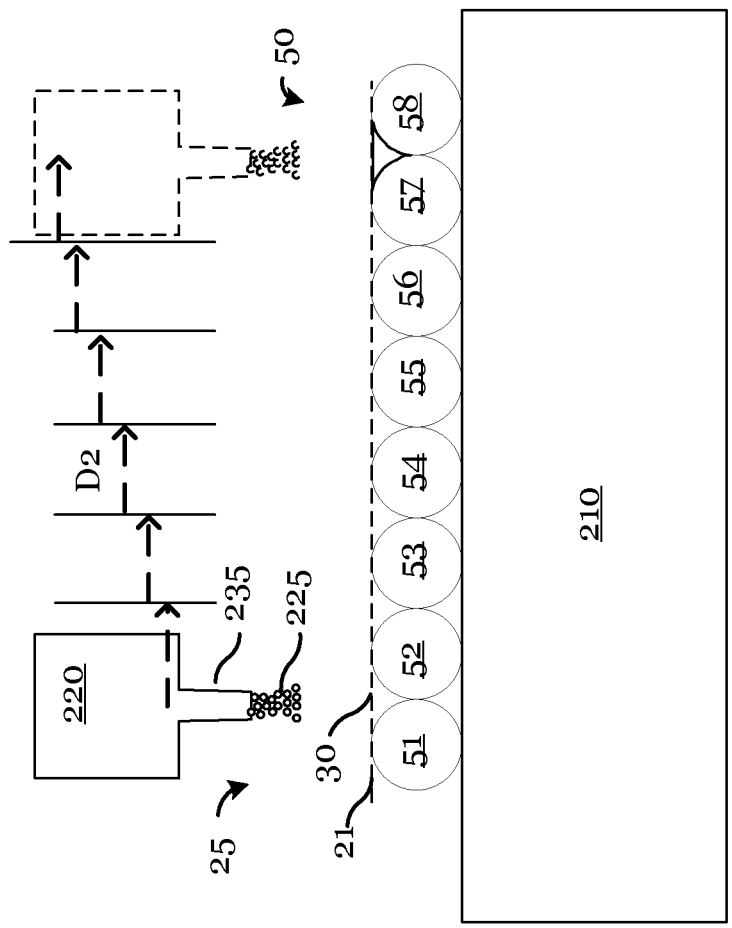
Figure 11B:
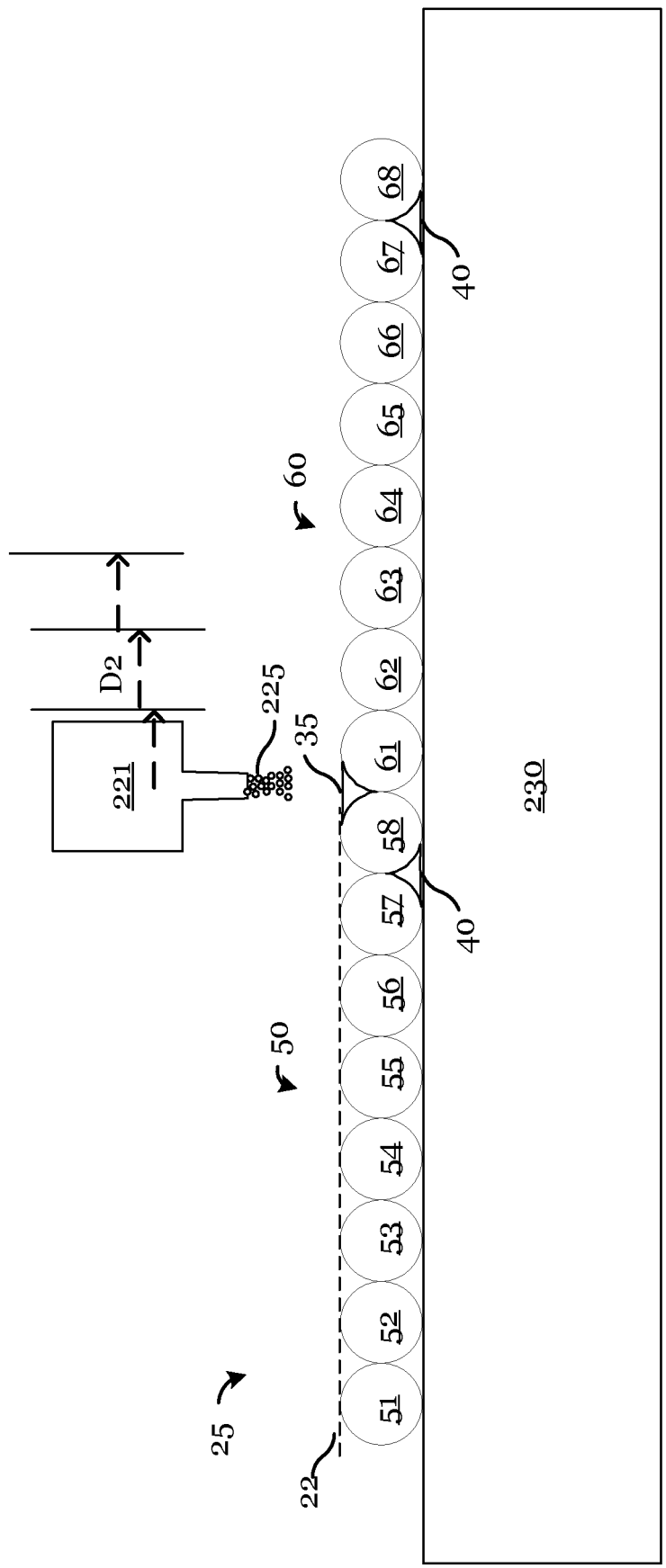

In accordance with the embodiments described previously in FIGS. 10A-10E, the fabrication process is performed with a moving ribbon or ribbon assembly that is passed through a first dispensing device with a nozzle moving in a direction transverse to the direction of the longitudinal passing ribbons. In other embodiments, the fabrication of the unitized flexible ribbon is performed with a stationary ribbon or ribbon assembly and a dispenser traveling over the length of the ribbon. FIGS. 11A and 11B illustrate a unitized flexible ribbon during various stages of fabrication in accordance with embodiments of the present application with a stationary ribbon or ribbon assembly.

FIG. 11A illustrates a plurality of flexible ribbons during formation of first bonding regions at a top side.

Similar to the prior embodiment, matrix material 225 is applied from a first dispensing tool 220 on the intersecting junctions between the optical fibers. The first dispensing tool 220 may be similar to the first dispensing device 226 described before. Unlike the prior embodiment, the optical fibers are positioned in a stationary position while the nozzle is moved.

The matrix material 225 is dispensed for a short time before a nozzle 235 within the first dispensing tool 220 shuts it off. For example, the matrix material 225 is released while the first dispensing tool 220 is moved relative to the first carrier 210 along a first direction parallel to the length of the optical fibers, which is into the plane of the page in FIG. 11A. Subsequently, the matrix material 225 is shut off so that the matrix material 225 is not released.

The first dispensing tool 220 is then moved relative to the first carrier 210 along the transverse direction D2 to move to the next intersecting junction of the first set of optical fibers 51-58. Further, another translation along the first direction may also be performed while the nozzle 235 is closed. Subsequently, after the translations in the first and the second directions, the nozzle is opened again and the matrix material 225 is released at the intersecting junction between adjacent optical fibers while moving the first dispensing tool 220 relative to the first carrier 210 along the first direction. The first dispensing tool 220 may thus step through the first set of optical fibers 51-58 until the matrix material 225 for forming the predetermined pattern of the first bonding regions 30 has been released.

The matrix material 225 is then cured to form the first flexible ribbon 50. Once the first dispensing tool 220 has traversed through all the optical fibers of the first set of optical fibers 51-58, a curing process may be provided to form the first bonding regions 30 having the first pattern 41, for example, as described above. Similarly, the steps of releasing the matrix material 225 may be repeated as described above while forming the first flexible ribbon 50 (see also schematic arrows showing the same) to form the second flexible ribbon.

Accordingly, a plurality of ribbons such as the first flexible ribbon 50 (as well as the second flexible ribbon 60) is formed.

FIG. 11B illustrates a cross-sectional view of the plurality of flexible ribbons during formation of second bonding regions at an opposite bottom side.

Unlike the prior embodiment of FIGS. 10C-10E, the flexible ribbons are positioned in a stationary position while the dispensing nozzle is moved. Accordingly, the plurality of flexible ribbons that are designed to be part of the unitized flexible ribbon such as the first flexible ribbon 50 and the second flexible ribbon 60 are arranged on a second carrier 230 or held in a stationary position between rollers. In particular, the first flexible ribbon 50 and the second flexible ribbon 60 are arranged so that a second side 22 that is opposite the first side 21 comprising the first bonding regions 30 faces away from the second carrier 230.

The second dispensing tool 221, which may be similar to the second dispensing device 227, may be the same tool as the first dispensing tool 220 used previously in one or more embodiments. Alternately, the second dispensing tool 221 to form the unitized ribbon may be different than the first dispensing tool 220. Similarly, the second carrier 230 may be the same or different from the first carrier 210 in various embodiments. Similarly, the matrix material 225 dispensed from the first dispensing tool 220 may be different from the matrix material 225 disposed from the second dispensing tool 221.

In embodiments such as the one described using FIG. 1A-1C, 2A-2B, or 3A-3C, a continuous flow of the matrix material 225 is maintained as the second dispensing tool 221 is moved relative to the second carrier 230 along a first direction parallel to the length of the first and the second flexible ribbons 50 and 60.

However, in other embodiments that use intermittent bonding regions such as the illustration of FIG. 4B, the matrix material 225 is dispensed for a short time before a nozzle 235 within the second dispensing tool 221 shuts it off. For example, the matrix material 225 is released while the second dispensing tool 221 is moved relative to the second carrier 230 along a first direction D1 parallel to the length of the optical fibers, which is into the plane of the page in FIG. 10B. Subsequently, the nozzle 235 is shut off so that the matrix material 225 is not applied. The second dispensing tool 221 is moved relative to the second carrier 230 along the second direction D2 to move to the next intersecting junction of the optical fibers. Further, another translation along the first direction D1 may also be performed while the nozzle is closed. Subsequently, after the translations in the first and the second directions, the nozzle is opened again and the matrix material 225 is released at the intersecting junction between adjacent optical fibers while moving the second dispensing tool 221 relative to the second carrier 230 along the first direction. The second dispensing tool 221 may thus step through the first flexible ribbon 50 and the second flexible ribbon 60 until the matrix material 225 for forming the predetermined pattern of the second bonding regions 35 has been released.

The matrix material 225 is then cured, for example, as described previously to form the flexible ribbon assembly 25.

In accordance with the embodiments described previously, the second bonding regions 35 may be continuous or intermittent and may comprise different patterns, e.g., wavelike or linear pattern with a variety of regular or irregular wavelengths, amplitudes, and phases which may be controlled by the relative positions of the second dispensing tool 221 and second carrier 230 during the application process.

Example embodiments of the present invention are summarized here. Other embodiments can also be understood from the entirety of the specification and the claims filed herein.

Example 1

An optical fiber cable includes a plurality of flexible ribbons, a plurality of first bonding regions and a second bonding region, where each of the plurality of flexible ribbons includes a plurality of optical fibers, where adjacent ones of the plurality of optical fibers are attached to each other by one of the plurality of first bonding regions. The second bonding region joins a first one of the plurality of flexible ribbons with a second one of the plurality of flexible ribbons.

Example 2

The cable of example 1, where the second bonding region has a lower bonding strength than one of the plurality of first bonding regions.

Example 3

The cable of one of examples 1 or 2, where the plurality of first bonding regions is disposed at a first side of the plurality of flexible ribbons, where the second bonding region is disposed at a second side of the plurality of flexible ribbons, and where the second side is opposite to the first side.

Example 4

The cable of one of examples 1 to 3, where the plurality of optical fibers extend along a length of the optical fiber cable, where the plurality of first bonding regions have a first pattern, and where the second bonding region extends through substantially all of the length of the optical fiber cable.

Example 5

The cable of example 4, where the second bonding region has a second pattern different from the first pattern.

Example 6

The cable of one of examples 1 to 5, where the second bonding region joins together exactly two of the plurality of optical fibers.

Example 7

The cable of one of examples 1 to 5, where the second bonding region joins optical fibers from different ribbons of the plurality of flexible ribbons and optical fibers within a single ribbon of the plurality of flexible ribbons.

Example 8

The cable of one of examples 1 to 5 and 7, where the second bonding region fills a first intersecting junction between a first one of the plurality of optical fibers and a second one of the plurality of optical fibers, and where the second bonding region fills a second intersecting junction between the second one of the plurality of optical fibers and a third one of the plurality of optical fibers.

Example 9

The cable of one of examples 1 to 5 and 7 to 8, where the second bonding region includes a first section, a second section, and a third section arranged in a wave pattern, the first section joining a last optical fiber of a first flexible ribbon of the plurality of flexible ribbons with a first optical fiber of a second flexible ribbon of the plurality of flexible ribbons, the second section joining the last optical fiber of the first flexible ribbon with a previous optical fiber of the first flexible ribbon, and the third section joining the first optical fiber of the second flexible ribbon with a second optical fiber of the second flexible ribbon.

Example 10

An optical fiber cable includes a plurality of flexible ribbons including a first flexible ribbon and a second flexible ribbon, a plurality of first bonding regions, and a plurality of second bonding regions including a first discrete region and a second discrete region. Each of the plurality of flexible ribbons includes a plurality of optical fibers. Adjacent ones of the plurality of optical fibers are attached to each other by one of the plurality of first bonding regions. The first discrete region joins a last optical fiber of the first flexible ribbon of the plurality of flexible ribbons with a first optical fiber of the second flexible ribbon of the plurality of flexible ribbons and is disposed at a first intersecting region between the last optical fiber and the first optical fiber. The second discrete region is spaced at a first pitch from the first discrete region, the second discrete region joining the last optical fiber with the first optical fiber and is disposed at a second intersecting region between the last optical fiber and the first optical fiber.

Example 11

The cable of example 10, where the first bonding regions are bonded to a first side of the plurality of flexible ribbons, where the second bonding regions are bonded to a second side of the plurality of flexible ribbons, and where the second side is opposite to the first side.

Example 12

The cable of one of examples 10 or 11, where the plurality of first bonding regions is arranged in a first pattern.

Example 13

The cable of example 12, where the plurality of second bonding regions is arranged in a second pattern different from the first pattern.

Example 14

The cable of example 13, where the second pattern includes a wavelike pattern.

Example 15

The cable of example 13, where the second pattern includes a zigzag pattern.

Example 16

The cable of one of examples 13 to 15, where a feature of the second pattern is different from a feature of the first pattern, where the feature includes amplitude, phase, pitch, bonding length, or duty cycle.

Example 17

The cable of one of examples 13 to 16, where along the second pattern, the plurality of optical fibers intersect with each other at a plurality of intersecting regions, where substantially all of the plurality of intersecting regions on a first side are filled with one of the plurality of second bonding regions.

Example 18. The cable of one of examples 13 to 16, along the second pattern, the plurality of optical fibers intersect with each other at a plurality of intersecting regions, where all of the plurality of intersecting regions on a first side are filled with one of the plurality of second bonding regions.

Example 19

The cable of one of examples 10 to 18, where the plurality of second bonding regions further include a third discrete region joining the first optical fiber of the second flexible ribbon with a second optical fiber of the second flexible ribbon.

Example 20

The cable of 19, where the third discrete region is the nearest region of the second bonding regions to the first discrete region.

Example 21

The cable of one of examples 19 to 20, where a bonding length of the third discrete region is different from a bonding length of the first discrete region.

Example 22

A method for forming an optical fiber cable includes forming a plurality of flexible ribbons by attaching a plurality of optical fibers using a plurality of first bonding regions, where adjacent ones of the plurality of optical fibers are attached to each other by one of the plurality of first bonding regions. The method may also include forming a flexible ribbon assembly by attaching the plurality of flexible ribbons using a plurality of second bonding regions, where adjacent ones of the plurality of flexible ribbons are attached to each other by one of the plurality of second bonding regions.

Example 23

The method of example 22, where forming the plurality of flexible ribbons includes: arranging the plurality of optical fibers; dispensing a matrix material at intersecting junctions between the plurality of optical fibers; and curing the matrix material.

Example 24

The method of one of examples 22 or 23, where forming the flexible ribbon assembly includes: arranging the plurality of flexible ribbons; dispensing a matrix material at an intersecting junction between the plurality of flexible ribbons; and curing the matrix material.

Example 25

The method of one of examples 22 to 24, where forming the plurality of flexible ribbons includes dispensing a first matrix material at intersecting junctions between the plurality of optical fibers at a first side of the plurality of optical fibers; and where forming the flexible ribbon assembly includes dispensing a second matrix material at an intersecting junction between the plurality of flexible ribbons at a second side of the plurality of optical fibers, the second side being opposite to the first side.

Example 26

The method of one of examples 22 to 25, forming a buffer tube including the flexible ribbon assembly, and forming the optical fiber cable including the buffer tube.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. An optical fiber cable comprising:
a plurality of flexible ribbons, each of the plurality of flexible ribbons comprising a plurality of optical fibers;

a plurality of first bonding regions, wherein adjacent ones of the plurality of optical fibers are attached to each other by one of the plurality of first bonding regions; and a second bonding region joining a first one of the plurality of flexible ribbons with a second one of the plurality of flexible ribbons, wherein the plurality of first bonding regions is disposed at a first side of the plurality of flexible ribbons, wherein the second bonding region is disposed at a second side of the plurality of flexible ribbons, and wherein the second side is opposite to the first side.

2. The cable of claim 1, wherein the second bonding region has a lower bonding strength than one of the plurality of first bonding regions.

3. The cable of claim 1, wherein the plurality of optical fibers extend along a length of the optical fiber cable, wherein the plurality of first bonding regions have a first pattern, and wherein the second bonding region extends through substantially all of the length of the optical fiber cable.

4. The cable of claim 3, wherein the second bonding region has a second pattern different from the first pattern.

5. The cable of claim 1, wherein the second bonding region joins together exactly two of the plurality of optical fibers.

6. The cable of claim 1, wherein the second bonding region joins optical fibers from different ribbons of the plurality of flexible ribbons and optical fibers within a single ribbon of the plurality of flexible ribbons.

7. The cable of claim 1, wherein the second bonding region fills a first intersecting junction between a first one of the plurality of optical fibers and a second one of the plurality of optical fibers, and wherein the second bonding region fills a second intersecting junction between the second one of the plurality of optical fibers and a third one of the plurality of optical fibers.

8. The cable of claim 1, wherein the second bonding region comprises a first section, a second section, and a third section arranged in a wave pattern, the first section joining a last optical fiber of a first flexible ribbon of the plurality of flexible ribbons with a first optical fiber of a second flexible ribbon of the plurality of flexible ribbons, the second section joining the last optical fiber of the first flexible ribbon with a previous optical fiber of the first flexible ribbon, and the third section joining the first optical fiber of the second flexible ribbon with a second optical fiber of the second flexible ribbon.

9. An optical fiber cable comprising:
a plurality of flexible ribbons comprising a first flexible ribbon and a second flexible ribbon, each of the plurality of flexible ribbons comprising a plurality of optical fibers;
a plurality of first bonding regions, wherein adjacent ones of the plurality of optical fibers are attached to each other by one of the plurality of first bonding regions; and
a plurality of second bonding regions comprising a first discrete region and a second discrete region, the first discrete region joining a last optical fiber of the first flexible ribbon of the plurality of flexible ribbons with a first optical fiber of the second flexible ribbon of the plurality of flexible ribbons and disposed at a first intersecting region between the last optical fiber and the first optical fiber, the second discrete region being spaced at a first pitch from the first discrete region, the second discrete region joining the last optical fiber with the first optical fiber and disposed at a second intersecting region between the last optical fiber and the first optical fiber.

10. The cable of claim 9, wherein the first bonding regions are bonded to a first side of the plurality of flexible ribbons, wherein the second bonding regions are bonded to a second side of the plurality of flexible ribbons, and wherein the second side is opposite to the first side.

11. The cable of claim 9, wherein the plurality of first bonding regions is arranged in a first pattern.

12. The cable of claim 11, wherein the plurality of second bonding regions is arranged in a second pattern different from the first pattern.

13. The cable of claim 12, wherein the second pattern comprises a wavelike pattern.

14. The cable of claim 12, wherein the second pattern comprises a zigzag pattern.

15. The cable of claim 12, wherein a feature of the second pattern is different from a feature of the first pattern, wherein the feature comprises amplitude, phase, pitch, bonding length, or duty cycle.

16. The cable of claim 12, wherein along the second pattern, the plurality of optical fibers intersect with each other at a plurality of intersecting regions, wherein substantially all of the plurality of intersecting regions on a first side are filled with one of the plurality of second bonding regions.

17. The cable of claim 12, along the second pattern, the plurality of optical fibers intersect with each other at a plurality of intersecting regions, wherein all of the plurality of intersecting regions on a first side are filled with one of the plurality of second bonding regions.

18. The cable of claim 9, wherein the plurality of second bonding regions further comprise a third discrete region joining the first optical fiber of the second flexible ribbon with a second optical fiber of the second flexible ribbon.

19. The cable of claim 18, wherein the third discrete region is the nearest region of the second bonding regions to the first discrete region.

20. The cable of claim 18, wherein a bonding length of the third discrete region is different from a bonding length of the first discrete region.

21. A method for forming an optical fiber cable, the method comprising:
forming a plurality of flexible ribbons by attaching a plurality of optical fibers using a plurality of first bonding regions, wherein adjacent ones of the plurality of optical fibers are attached to each other by one of the plurality of first bonding regions; and
forming a flexible ribbon assembly by attaching the plurality of flexible ribbons using a plurality of second bonding regions, wherein adjacent ones of the plurality of flexible ribbons are attached to each other by one of the plurality of second bonding regions, wherein forming the flexible ribbon assembly comprises arranging the plurality of flexible ribbons, dispending a matrix material at an intersecting junction between the plurality of flexible ribbons, and curing the matrix material.

22. The method of claim 21, wherein forming the plurality of flexible ribbons comprises:
arranging the plurality of optical fibers;
dispensing a matrix material at intersecting junctions between the plurality of optical fibers; and
curing the matrix material.

23. The method of claim 21,
wherein forming the plurality of flexible ribbons comprises dispensing a first matrix material at intersecting junctions between the plurality of optical fibers at a first side of the plurality of optical fibers; and wherein forming the flexible ribbon assembly comprises dispensing a second matrix material at an intersecting junction between the plurality of flexible ribbons at a second side of the plurality of optical fibers, the second side being opposite to the first side.

24. The method of claim 21, forming a buffer tube comprising the flexible ribbon assembly, and forming the optical fiber cable comprising the buffer tube.

25. The cable of claim 1, wherein the second bonded region comprises a cured matrix material that adhesively bonds with a surface of the first one of the plurality of flexible ribbons with a surface of the second one of the plurality of flexible ribbons.

26. The cable of claim 9, plurality of second bonding regions comprises a cured matrix material.

* * * * *